US009645926B2

United States Patent
Takada et al.

(10) Patent No.: US 9,645,926 B2
(45) Date of Patent: May 9, 2017

(54) STORAGE SYSTEM AND METHOD FOR MANAGING FILE CACHE AND BLOCK CACHE BASED ON ACCESS TYPE

(71) Applicant: Hitachi, Ltd., Tokyo (JP)

(72) Inventors: Masanori Takada, Yokohama (JP); Akira Yamamoto, Sagamihara (JP); Hiroshi Hirayama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 405 days.

(21) Appl. No.: 13/695,565

(22) PCT Filed: Oct. 19, 2012

(86) PCT No.: PCT/JP2012/006701
§ 371 (c)(1),
(2) Date: Oct. 31, 2012

(87) PCT Pub. No.: WO2014/061068
PCT Pub. Date: Apr. 24, 2014

(65) Prior Publication Data
US 2014/0115255 A1 Apr. 24, 2014

(51) Int. Cl.
*G06F 12/08* (2016.01)
*G06F 12/0806* (2016.01)
(Continued)

(52) U.S. Cl.
CPC ...... *G06F 12/0806* (2013.01); *G06F 12/0875* (2013.01); *G06F 12/0895* (2013.01)

(58) Field of Classification Search
None
See application file for complete search history.

(56) References Cited

U.S. PATENT DOCUMENTS

2002/0152339 A1   10/2002  Yamamoto
2003/0172325 A1*  9/2003   Wyatt et al. ............ 714/53
(Continued)

FOREIGN PATENT DOCUMENTS

JP   2008-004120 A   1/2008
JP   2008-257682 A   10/2008

OTHER PUBLICATIONS

Prabhu, Gurpur. "Interaction Policies with Main Memory". Published Sep. 17, 2011. <http://www.cs.iastate.edu/~prabhu/Tutorial/CACHE/interac.html>.*

(Continued)

*Primary Examiner* — Charles Rones
*Assistant Examiner* — Hewy Li
(74) *Attorney, Agent, or Firm* — Foley & Lardner LLP

(57) ABSTRACT

It is provided a storage system, comprising a storage device for storing data and at least one controller for controlling reading/writing of the data from/to the storage device. The at least one controller each includes a first cache memory for temporarily storing the data read from the storage device by file access, and a second cache memory for temporarily storing the data to be read/written from/to the storage device by block access. The processor reads the requested data from the storage device in the case where data requested by a file read request received from a host computer is not stored in the first cache memory, stores the data read from the storage device in the first cache memory without storing the data in the second cache memory, and transfers the data stored in the first cache memory to the host computer that has issued the file read request.

14 Claims, 18 Drawing Sheets

(51) Int. Cl.
  *G06F 12/0875* (2016.01)
  *G06F 12/0895* (2016.01)

(56) References Cited

U.S. PATENT DOCUMENTS

| | | |
|---|---|---|
| 2005/0063216 A1* | 3/2005 | Wilkins et al. ............... 365/154 |
| 2005/0172043 A1 | 8/2005 | Nonaka et al. |
| 2008/0244196 A1 | 10/2008 | Shitomi et al. |
| 2009/0210620 A1 | 8/2009 | Jibbe et al. |
| 2010/0082904 A1 | 4/2010 | Juenemann et al. |
| 2011/0314469 A1 | 12/2011 | Qian et al. |

OTHER PUBLICATIONS

PCT International Search Report and Written Opinion on application PCT/JP2012/006701 mailed Jul. 19, 2013; 7 pages.

\* cited by examiner

*prior art*

Fig. 10

| EVENT | | CURRENT STATE | | | |
|---|---|---|---|---|---|
| | | NONE | FILE CLEAN | BLOCK CLEAN | BLOCK DIRTY |
| FILE READ | ACTION | STORE TO F$ DIRECTLY | KEEP F$ | STORE TO F$ DISCARD B$ | KEEP B$ |
| | NEW STATE | FILE CLEAN | FILE CLEAN | FILE CLEAN | BLOCK DIRTY |
| FILE WRITE | ACTION | STORE TO B$ | DISCARD F$ STORE TO B$ | STORE TO B$ | STORE TO B$ |
| | NEW STATE | BLOCK DIRTY | BLOCK DIRTY | BLOCK DIRTY | BLOCK DIRTY |
| BLOCK READ | ACTION | STORE TO B$ | DISCARD F$ STORE TO B$ | KEEP B$ | KEEP B$ |
| | NEW STATE | BLOCK CLEAN | BLOCK CLEAN | BLOCK CLEAN | BLOCK CLEAN |
| BLOCK WRITE | ACTION | STORE TO B$ | DISCARD F$ STORE TO B$ | STORE TO B$ | STORE TO B$ |
| | NEW STATE | BLOCK DIRTY | BLOCK DIRTY | BLOCK DIRTY | BLOCK DIRTY |
| DESTAGE COMPL. | ACTION | - | - | - | DISCARD ONE OF B$s |
| | NEW STATE | - | - | - | BLOCK CLEAN |
| FILE REPLACED | ACTION | - | DISCARD F$ | - | - |
| | NEW STATE | - | NONE | - | - |
| BLOCK REPLACED | ACTION | - | - | DISCARD B$ | - |
| | NEW STATE | - | - | NONE | - |

F$ : FILE DATA CACHE
B$ : BLOCK DATA CACHE

Fig. 17

| EVENT | | CURRENT STATE | | | | |
|---|---|---|---|---|---|---|
| | | NONE | FILE CLEAN | BLOCK CLEAN | BLOCK DIRTY | FILE CLEAN BLOCK DIRTY |
| FILE READ | ACTION | STORE TO F$ | KEEP F$ | STORE TO F$ DISCARD B$ | STORE TO F$ KEEP B$ | KEEP F$ KEEP B$ |
| | NEW STATE | FILE CLEAN | FILE CLEAN | FILE CLEAN | FC BD | FC BD |
| FILE WRITE | ACTION | STORE TO B$ STORE TO F$ | STORE TO F$ STORE TO B$ | STORE TO F$ STORE TO B$ | STORE TO F$ STORE TO B$ | STORE TO F$ STORE TO B$ |
| | NEW STATE | FC BD | FC BD | FC BD | FC BD | FC BD |
| BLOCK READ | ACTION | STORE TO B$ | DISCARD F$ STORE TO B$ | KEEP B$ | KEEP B$ | KEEP F$ KEEP B$ |
| | NEW STATE | BLOCK CLEAN | BLOCK CLEAN | BLOCK CLEAN | BLOCK DIRTY | FC BD |
| BLOCK WRITE | ACTION | STORE TO B$ | DISCARD F$ STORE TO B$ | STORE TO B$ | STORE TO B$ | DISCARD F$ STORE TO B$ |
| | NEW STATE | BLOCK DIRTY | BLOCK DIRTY | BLOCK DIRTY | BLOCK DIRTY | BLOCK DIRTY |
| DESTAGE COMPL. | ACTION | - | - | - | DISCARD ONE OF B$s | DISCARD B$ |
| | NEW STATE | - | - | - | BLOCK CLEAN | FILE CLEAN |
| FILE RE-PLACED | ACTION | - | DISCARD F$ | - | - | DISCARD F$ |
| | NEW STATE | - | NONE | - | - | BLOCK DIRTY |
| BLOCK RE-PLACED | ACTION | - | - | DISCARD B$ | - | - |
| | NEW STATE | - | - | NONE | - | - |

F$ : FILE DATA CACHE
B$ : BLOCK DATA CACHE
FC BD : FILE CLEAN AND BLOCK DIRTY

STORAGE SYSTEM AND METHOD FOR MANAGING FILE CACHE AND BLOCK CACHE BASED ON ACCESS TYPE

TECHNICAL FIELD

This invention relates to a storage system for storing data in a storage device.

BACKGROUND ART

Examples of the storage system include a block storage having only the block I/O interface and a file storage having only the file I/O interface. On the other hand, in recent years, there is a demand that the block storage and the file storage be consolidated to provide both functions thereof to one device. Therefore, as disclosed in Non Patent Literature 1, there is provided a unified storage system in which one storage system includes both interfaces for the block storage and the file storage. The unified storage system includes a SAN interface and a NAS interface, and allocates storage area to the SAN interface and the NAS interface with a high degree of freedom.

Further, as disclosed in Patent Literature 2, there is known a technology which uses of virtualization technology to control a plurality of OSs to run on one piece of hardware.

CITATION LIST

Patent Literature

PTL 1: US 2005/0172043 A1
PTL 2: US 2011/0314469 A1

SUMMARY OF INVENTION

Technical Problem

To realize the above-mentioned unified storage system, the file I/O interface and the block I/O interface need to be implemented in one device. An access method using the file I/O interface is greatly different from an access method using the block I/O interface. The file I/O interface uses a directory and a file name to designate data to be accessed, the data to be accessed having a variable size. On the other hand, the block I/O interface uses a volume number and a sector number (LBA) to designate data to be accessed, the data to be accessed having a fixed size. In this manner, those methods are greatly different from each other, and hence it is desired that the block storage and the file storage be realized by separate pieces of software and that each of the block storage and the file storage be operated on a virtual machine.

However, in a case where data accessed via the file I/O interface is actually read from and written to a drive, a block storage function is used to access the drive. In this case, two kinds of cache memories, in other words, a cache memory of the file storage and a cache memory of the block storage, are provided in a physically one device. Therefore, the data accessed through the file I/O interface may be stored in both the cache memory of the file storage and the cache memory of the block storage.

In this case, the data is cached in the two cache memories in an overlapping manner, and hence a capacity of the cache memories cannot be put to effective use, which lowers a cache hit rate and deteriorates responsiveness. Further, the cache is managed in a duplicate manner, and hence a processing amount of a processor increases in order to manage the respective caches, which deteriorates performance of the storage system. In addition, the cache data is duplicately stored, to thereby increase an I/O frequency to/from the memory in response to access from the host computer, which consumes a memory bandwidth and deteriorates the performance of the storage system.

This invention provides a storage system for controlling a plurality of cache memories in response to a request received from the host computer and appropriately performing read/write.

Solution to Problem

In a representative example of the invention disclosed in this application, data regarding file access which is read from a storage device is stored in a file cache memory without being stored in a block cache memory.

The representative one of inventions disclosed in this application is outlined as follows. There is provided a storage system, comprising a storage device for storing data, and at least one controller for controlling reading/writing of the data from/to the storage device. The at least one controller each includes a processor for executing a program, a memory for storing the program executed by the processor, a first cache memory for temporarily storing the data read from the storage device by file access, and a second cache memory for temporarily storing the data to be read/written from/to the storage device by block access. The processor reads the requested data from the storage device in the case where data requested by a file read request received from a host computer is not stored in the first cache memory, stores the data read from the storage device in the first cache memory without storing the data in the second cache memory, and transfers the data stored in the first cache memory to the host computer that has issued the file read request.

Advantageous Effects of Invention

According to the representative aspect of this invention, it is possible to suppress overlapping cache of the same data in the file storage and the block storage, and to put the capacity of the cache memory to effective use.

Objects, configurations, and effects other than those described above become apparent from the following descriptions of embodiments.

BRIEF DESCRIPTION OF DRAWINGS

FIG. 10 is an explanatory diagram illustrating an example of actions and new states in cases where events occur in respective states illustrated in FIG. 6 to FIG. 9.

FIG. 17 is an explanatory diagram illustrating an example of actions and new states in cases where events occur in a second embodiment of this invention.

DESCRIPTION OF EMBODIMENTS

This specification discloses a technology for improving performance in a storage system.

Embodiments of this invention are described below with reference to the accompanying drawings. However, it should be noted that the embodiments described below are merely examples for realizing this invention and do not limit a technical scope of this invention. Further, components common across the respective drawings are denoted by the same reference symbols.

Example 1

A first embodiment is one embodiment of this invention in which a unified storage system is optimized in terms of processing of a cache memory to improve performance thereof. This embodiment is described below in detail with reference to the accompanying drawings.

Figure 1:
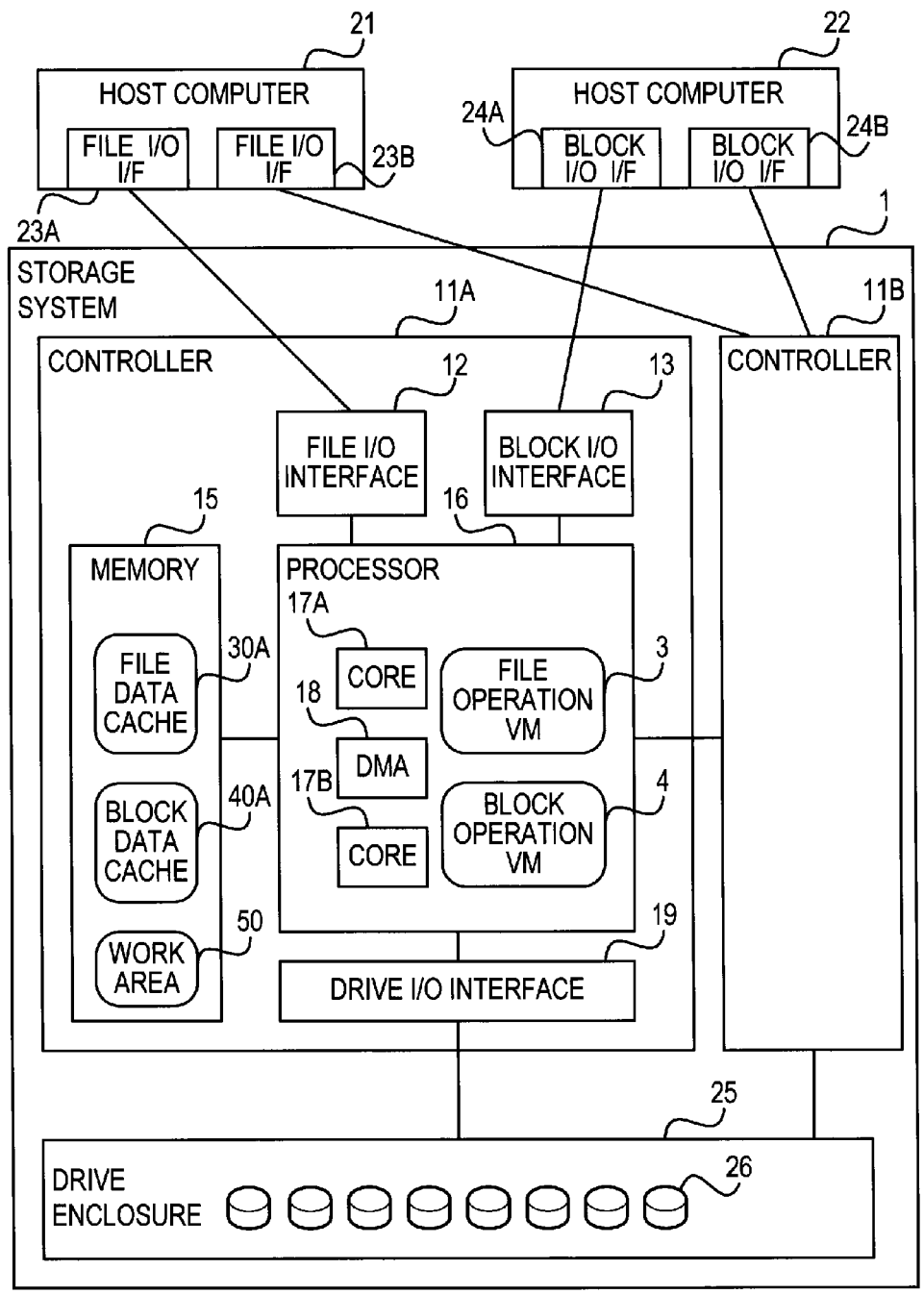
FIG. 1 is a block diagram illustrating an example of a computer system including a storage system according to a first embodiment of this invention.

FIG. 1 is a block diagram illustrating an example of a computer system including a storage system 1 according to the first embodiment.

The computer system illustrated in FIG. 1 includes host computers 21 and 22 for performing data processing and arithmetic operation and the storage system 1.

The host computers 21 and 22 include a file I/O interface 23 for executing file I/O to/from the storage system 1 and a block I/O interface 24 for executing block I/O to/from the storage system 1, respectively. In general, in order to continue an operation at a time of a failure, at least two paths are often used to couple the host computer 21 to the storage system 1 and to couple the host computer 22 to the storage system 1, but one path may be used for the coupling. Further, one host computer 21 or the like may include both a file I/O interface and a block I/O interface.

The storage system 1 includes two storage controllers 11A and 11B and a drive enclosure 25. The drive enclosure 25 includes a plurality of drives 26. The drive 26 may be any one of a hard disk drive (HDD) and a solid-state drive (SSD) mounted with a non-volatile memory such as a flash memory. The drive 26 stores data transmitted from the host computers 21 and 22. The data is made redundant with the plurality of drives 26 having a RAID structure, which can prevent the data from being lost in a case where a failure occurs in the drive 26.

The storage controller 11A includes a file I/O interface 12, a block I/O interface 13, a memory 15, a processor 16, and a drive I/O interface 19. The storage controller 11B also includes the same components as those of the storage controller 11A.

The file I/O interface 12 receives file access to the data transmitted from the host computer 21 and stored on the drive 26. The block I/O interface 13 receives block access to the data transmitted from the host computer 21 and stored on the drive 26. The drive I/O interface 19 controls input/output of data to/from the drive 26. The file I/O interface 12, the block I/O interface 13, and the drive I/O interface 19 each include an LSI for controlling a network protocol.

The processor 16 includes a plurality of processor cores 17A and 17B and a DMA 18 for transferring data. Further, by the processor 16 executing a predetermined program, a file operation VM 3 for providing a file storage function and a block operation VM 4 for providing a block storage function run on the processor 16. Those VMs run on the processor cores 17A and 17B, respectively.

It should be noted that, in the storage system according to this embodiment, the file storage function and the block storage function are realized by virtual machines, but may be realized instead by an application program for providing each of the functions.

The program executed by the processor 16 is provided to the computer via a non-volatile storage medium or a network, and stored in an auxiliary storage device (not shown) being a non-temporary storage medium. In other words, the program executed by the processor 16 is read from the auxiliary storage device, loaded into the memory 15, and executed by the processor 16.

The memory 15 includes a work area 50 for storing software or the like executed by the processor 16. In addition, the memory 15 includes a file data cache area 30A managed by the file operation VM 3 and a block data cache area 40A managed by the block operation VM 4.

Figure 2:
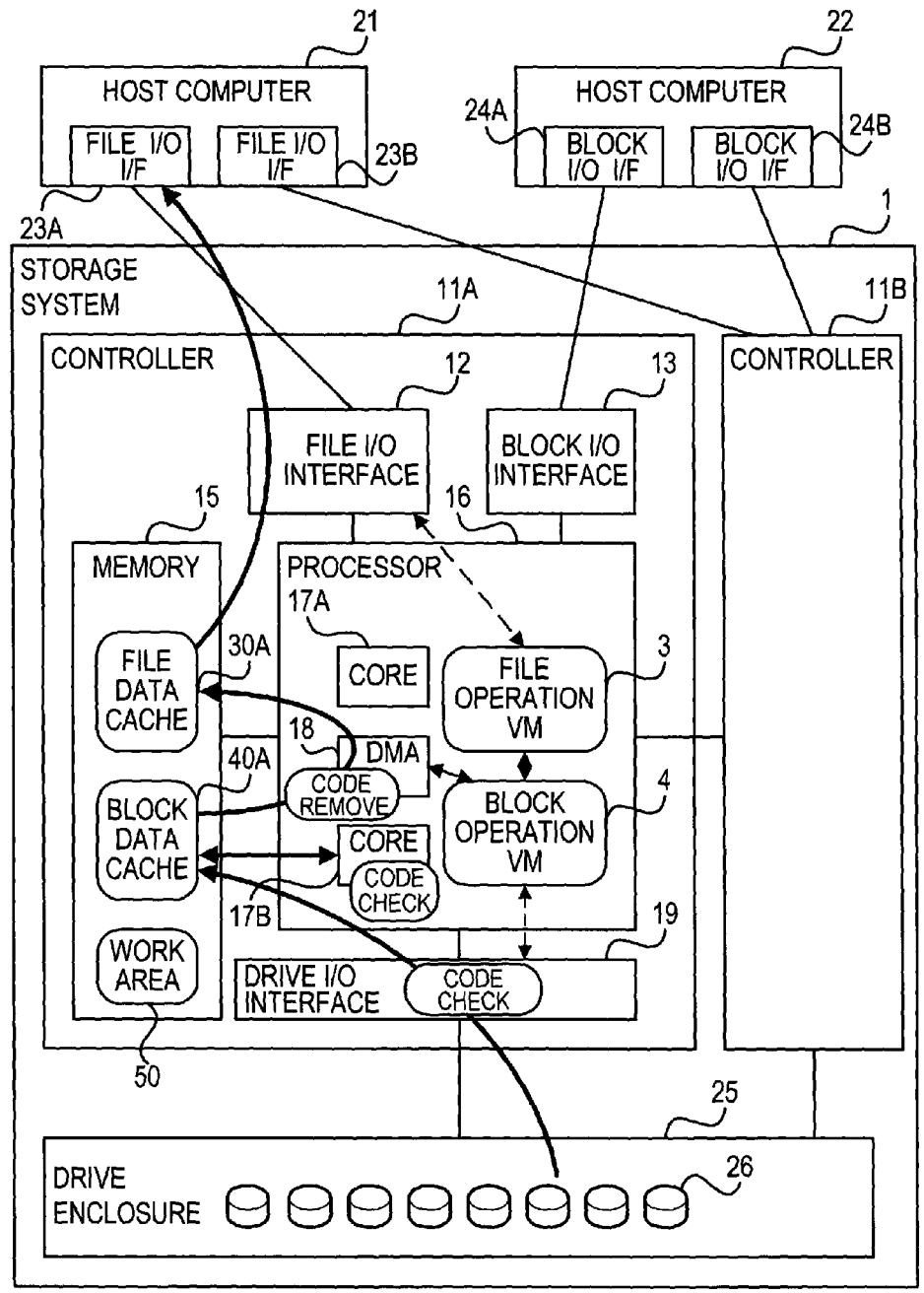
FIG. 2 is an explanatory diagram illustrating a response to a file read request issued from a host computer in a case where each of a block storage function and a file storage function is simply operated in the storage system configured as illustrated in FIG. 1.

FIG. 2 is a diagram illustrating a response to a file read request issued from the host computer in a case where each of the block storage function and the file storage function is simply operated in the storage system configured as illustrated in FIG. 1.

First, the host computer 21 issues a file read request to the storage system 1 through a file I/O interface 23A.

In the storage system 1, the file I/O interface 12 receives the read request issued from the host computer 21, and notifies the file operation VM 3 of the received file read request.

When receiving the notification that the file read request has been received, the file operation VM 3 determines whether or not the file data cache area 30A stores the requested data. When the file data cache area 30A does not store the requested data, the file operation VM 3 commands the block operation VM 4 to read the requested data.

When receiving the data read command, the block operation VM 4 determines whether or not the block data cache area 40A stores the data to be read. When the block data cache area 40A does not store the data to be read, the block operation VM 4 issues the read request for the data to the drive I/O interface 19.

When receiving the read request from the block operation VM 4, the drive I/O interface 19 reads the data from the drive 26, and verifies whether or not there is an error in the read data by using an integrity code such as a data integrity field (DIF). After that, the drive I/O interface 19 stores the read data in the block data cache area 40A, and notifies the block operation VM 4 of data storage completion.

When receiving the data storage completion notification, the block operation VM 4 verifies that there is no error in the data by using the integrity code, and then commands the DMA 18 to transfer the data from the block data cache area 40A to the file data cache area 30A. At this time of transfer, the integrity code for block data is removed.

The DMA 18 transfers the commanded data, and notifies the block operation VM 4 of data transfer completion.

When receiving the data transfer completion notification, the block operation VM 4 notifies the file operation VM 3 of the data transfer completion with respect to the file data cache area 30A.

When receiving the data transfer completion notification, the file operation VM 3 commands the file I/O interface 12 to return the data stored in the file data cache area 30A to the host computer 21.

When receiving the data return command, the file I/O interface 12 reads the data from the file data cache area 30A, and transfers the read data to the file I/O interface 23A of the host computer 21.

In this manner, in the case where the block storage function and the file storage function are simply operated, the two cache memories of the block data cache area 40A and the file data cache area 30A are passed through until the data for which the request has been received is returned from the drive 26 to the host computer 21. Further, both the file operation VM 3 and the block operation VM 4 manage the input/output of data to/from the cache memories.

Figure 3:
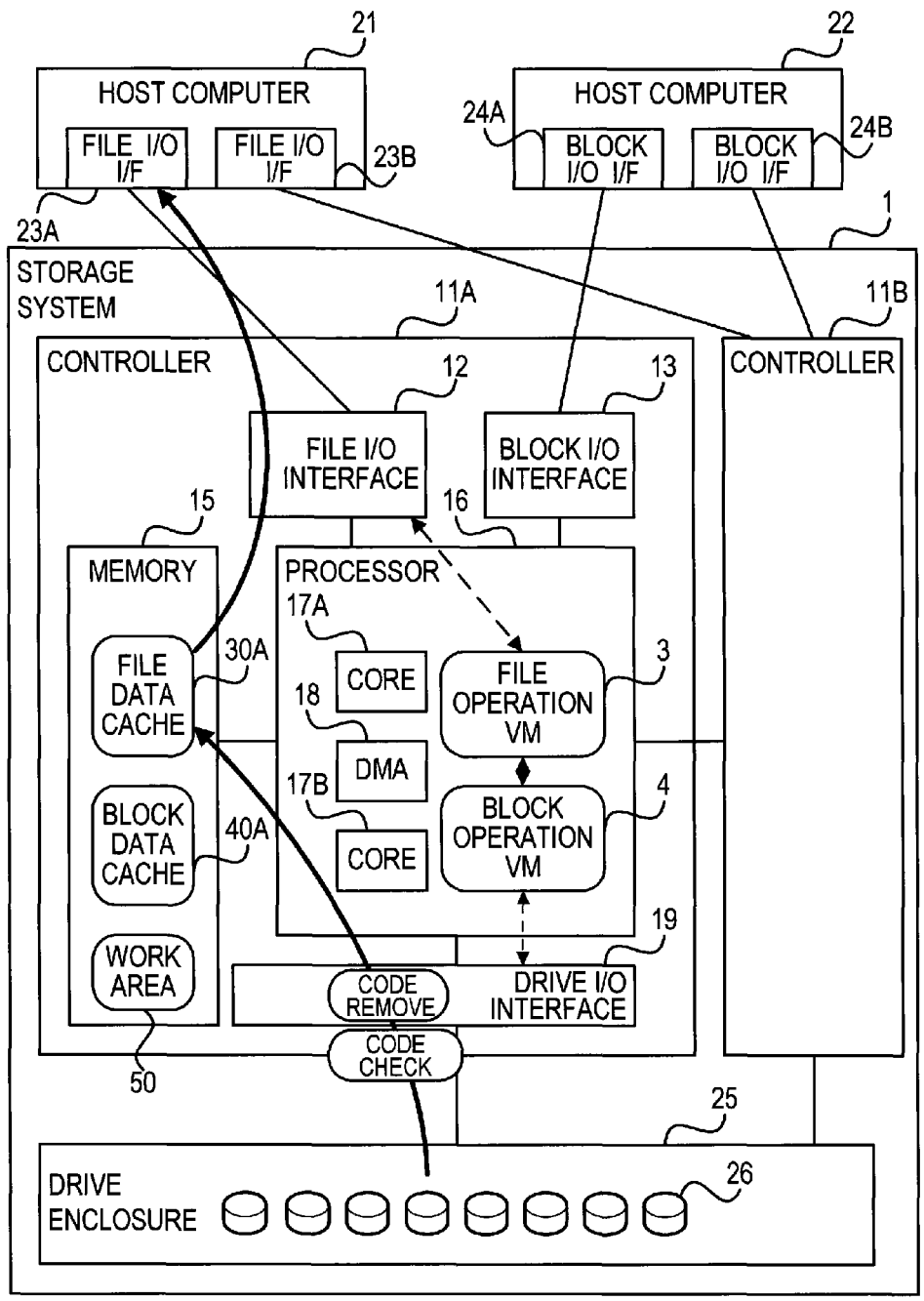
FIG. 3 is an explanatory diagram illustrating a response to a file read request issued from the host computer in the storage system according to the first embodiment of this invention.

FIG. 3 is a diagram illustrating a response to the file read request issued from the host computer 21 in the storage system according to the first embodiment.

First, the host computer 21 issues the file read request to the storage system 1 through the file I/O interface 23A.

In the storage system 1, the file I/O interface 12 receives the read request issued from the host computer 21, and notifies the file operation VM 3 of the received file read request.

When receiving the notification that the file read request has been received, the file operation VM 3 determines whether or not the file data cache area 30A stores the requested data. When the file data cache area 30A does not store the requested data, the file operation VM 3 commands the block operation VM 4 to read the requested data.

When receiving the data read command, the block operation VM 4 determines whether or not the block data cache area 40A stores the data to be read. When the block data cache area 40A does not store the data to be read, the block operation VM 4 issues the read request for the data to the drive I/O interface 19. At this time, as a storage destination of the data read from the drive 26, the block operation VM 4 designates, instead of the block data cache area 40A, the file data cache area 30A being a final destination to which the data is to be returned and which has been received from the file operation VM 3.

When receiving the read request from the block operation VM 4, the drive I/O interface 19 reads the data from the drive 26, and verifies whether or not there is an error in the read data by using the integrity code such as the data integrity field (DIF). After that, the drive I/O interface 19 removes the integrity code, stores the data from which the integrity code has been removed in the file data cache area 30A, and notifies the block operation VM 4 of the data storage completion. Accordingly, compared with a conventional method of removing the integrity code after storing the data provided with the integrity code in the block data cache area 40A and then storing the data from which the integrity code has been removed in the file data cache area 30A, it becomes unnecessary to read/write data from/to the block data cache area 40A. Therefore, a memory access amount decreases, which can improve the performance. Further, the data from which the integrity code has been removed is stored in the file data cache area 30A, and hence conventional processing suffices as the processing of the file operation VM 3.

When receiving the data storage completion notification, the block operation VM 4 notifies the file operation VM 3 of the data transfer completion with respect to the file data cache area 30A.

When receiving the data transfer completion notification, the file operation VM 3 commands the file I/O interface 12 to return the data stored in the file data cache area 30A to the host computer 21.

When receiving the data return command, the file I/O interface 12 reads the data from the file data cache area 30A, and transfers the read data to the file I/O interface 23A of the host computer 21.

In this manner, in the first embodiment of this invention, only the file operation VM 3 manages the cache memory in response to the file read request. Therefore, a processing amount handled by the block operation VM 4 and access to the memory 15 therefrom decrease, which improves the performance of the storage system. Further, the block data cache area 40A is not used, which allows the memory 15 to be put to effective use.

Figure 4:
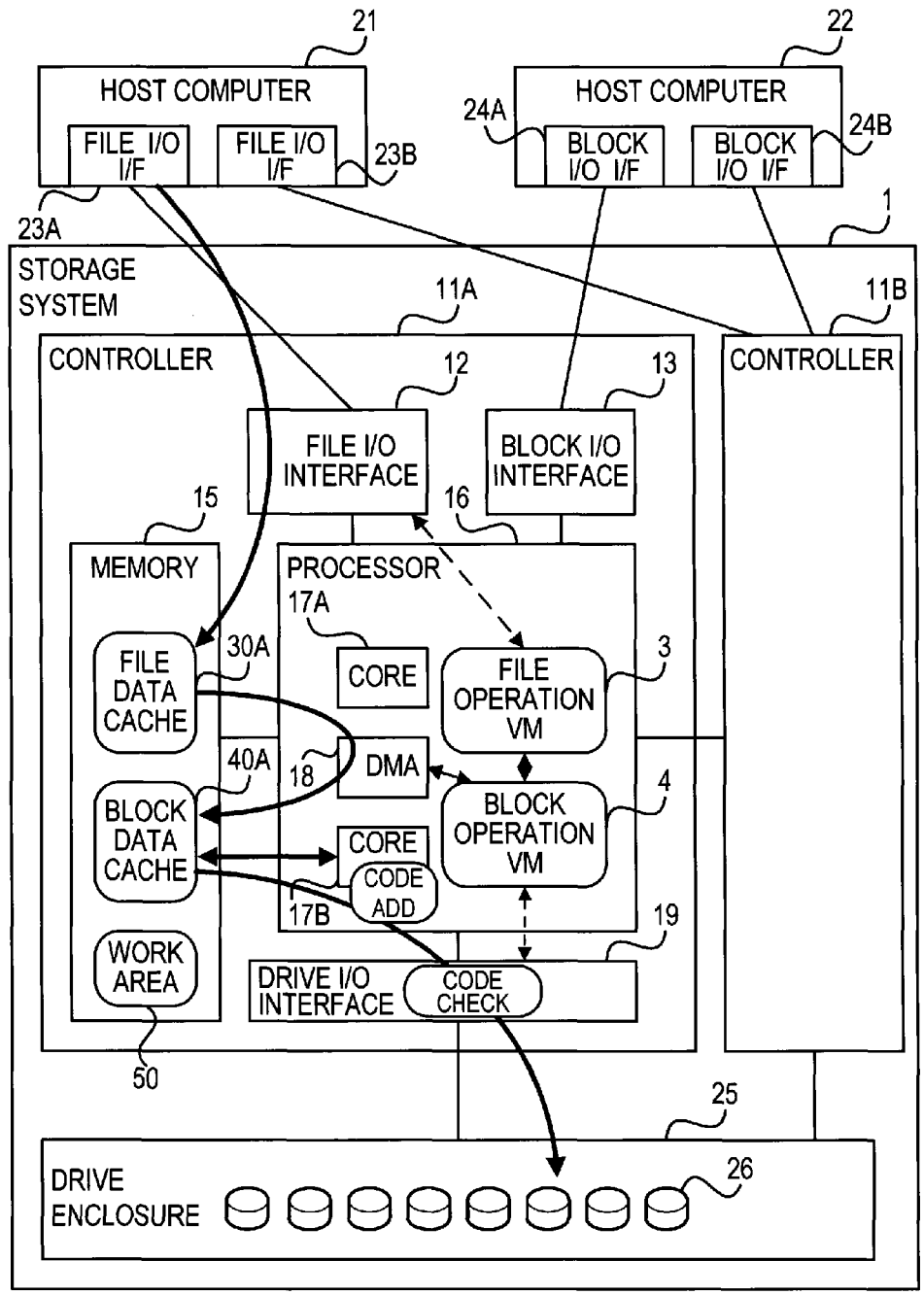
FIG. 4 is an explanatory diagram illustrating writing of data for which a file write request has been received from the host computer to a drive in the storage system according to the first embodiment of this invention.

FIG. 4 is a diagram illustrating writing of data for which a file write request has been received from the host computer 21 to a drive in the storage system according to the first embodiment.

First, the host computer 21 issues a file write request from the file I/O interface 23A to the storage system 1.

In the storage system 1, the file I/O interface 12 receives the write request issued from the host computer 21, and notifies the file operation VM 3 of the received file write request.

When receiving the notification that the file write request has been received, the file operation VM 3 reserves, in the file data cache area 30A, an area for retaining the data until the writing of the data requested to be written is completed, and commands the host computer 21 to transfer the data to the reserved area through the file I/O interface 12.

After that, the file I/O interface 12 temporarily stores the data transferred from the host computer 21 in the file data cache area 30A, and notifies the file operation VM 3 of the data storage completion.

The file operation VM 3 calculates a block address corresponding to the data stored in the file data cache area 30A, and commands the block operation VM 4 to write the data.

When receiving the data write command, the block operation VM 4 reserves, in the block data cache area 40A, an area for storing the data to be written, and commands the DMA 18 to transfer the data from the file data cache area 30A to the block data cache area 40A.

The DMA 18 transfers the commanded data, and notifies the block operation VM 4 of the data transfer completion.

When receiving the data transfer completion notification, the block operation VM 4 calculates the integrity code such as the DIF for the transferred data, and writes the data provided with the integrity code to the block data cache area 40A. After that, the block operation VM 4 commands the drive I/O interface 19 to read the data from the block data cache area 40A, check the integrity code, and write the data to the drive 26.

When receiving the write request for the data from the block operation VM 4, the drive I/O interface 19 writes the requested data to the drive 26, and notifies the block operation VM 4 of write completion.

When receiving the data write completion notification, the block operation VM 4 notifies the file operation VM 3 of data write completion.

When receiving the data write completion notification, the file operation VM 3 notifies the host computer 21 of the data write completion via the file I/O interface 12.

Figure 5:
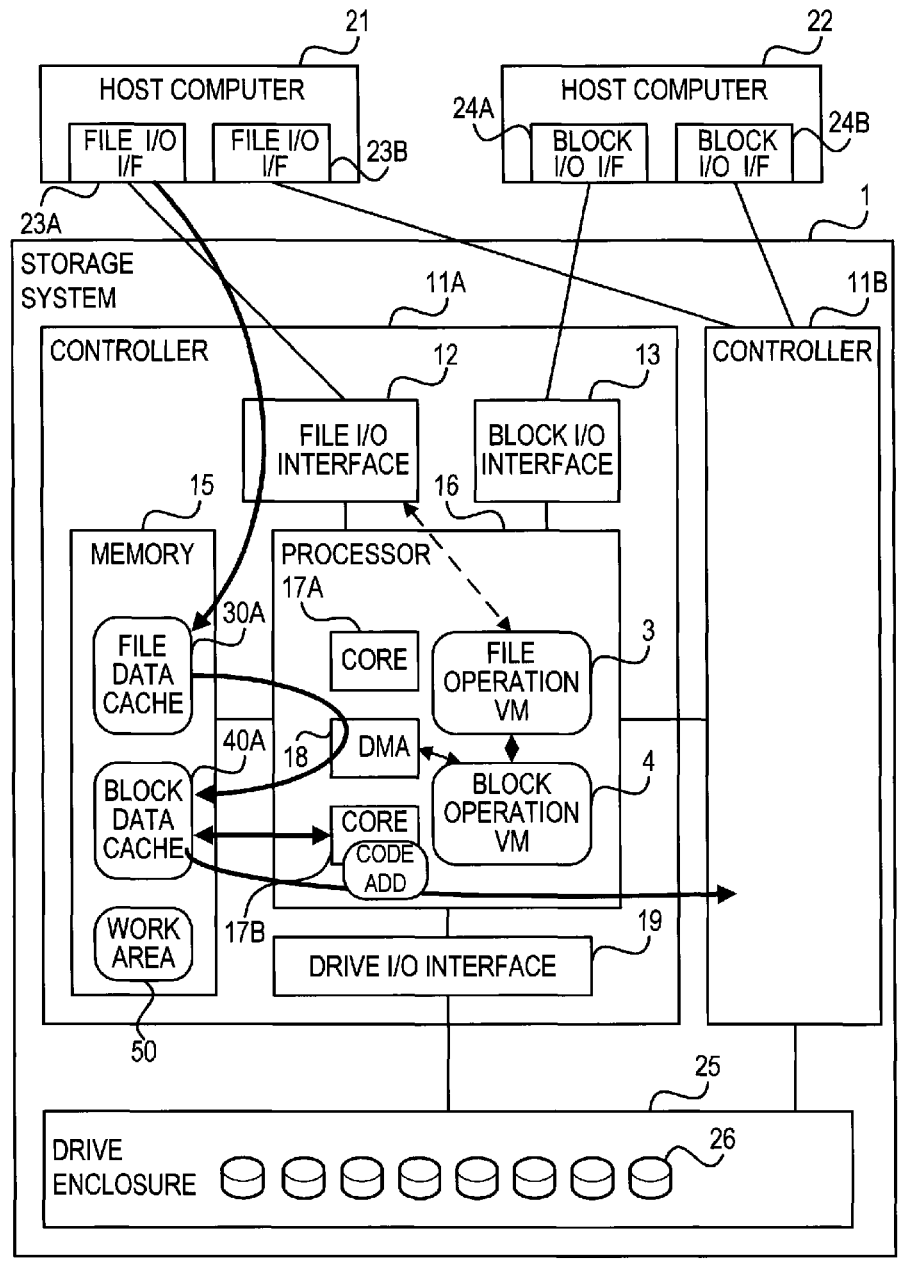
FIG. 5 is an explanatory diagram illustrating duplexing of data for which a file write request issued from the host computer has been received into two storage controllers in the storage system according to the first embodiment of this invention.

FIG. 5 is a diagram illustrating duplexing of the data for which the file write request issued from the host computer 21 has been received into the two storage controllers 11A and 11B in order to guarantee the data in the storage system according to the first embodiment. The processing of the DMA 18 up to steps of transferring the data to the block data cache area 40A and notifying the block operation VM 4 is the same as in FIG. 4. The subsequent procedure is as follows.

When receiving the data transfer completion notification, the block operation VM 4 calculates the integrity code such as the DIF for the transferred data, and writes the data provided with the integrity code to the block data cache area 40A. After that, the block operation VM 4 commands the DMA 18 to transfer the data stored in the block data cache area 40A to the storage controller 11B.

The DMA 18 transfers the commanded data to the storage controller 11B, and notifies the block operation VM 4 of the data transfer completion.

When the block operation VM 4 receives the data transfer completion notification and completes duplexing the data, the block operation VM 4 notifies the file operation VM 3 of the data transfer completion. The subsequent processing is the same as in FIG. 4.

FIG. 6 to FIG. 9 are diagrams illustrating states of data cache areas 30A, 30B, 40A, and 40B according to the first embodiment. Those states occur when the host computer 21 or the like reads/writes data.

Figure 6:
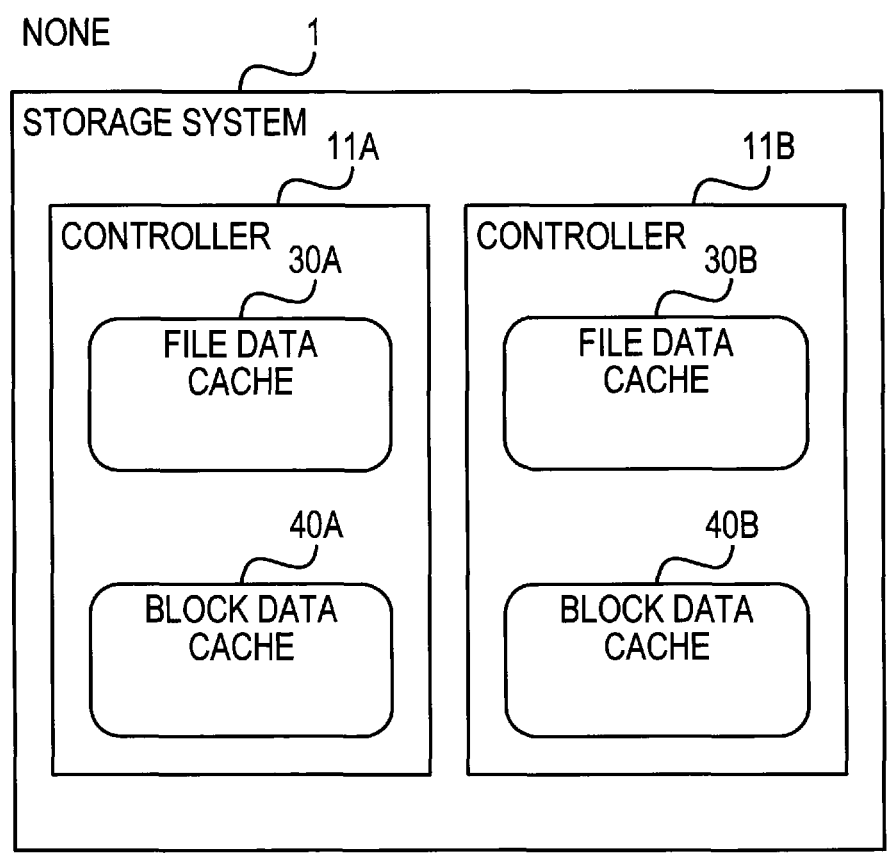
FIG. 6 is an explanatory diagram illustrating states of a cache area according to the first embodiment of this invention.

FIG. 6 illustrates a state "None". The None state is a state in which no data is stored in any one of the file data cache areas 30A and 30B and the block data cache areas 40A and 40B of the two controllers.

Figure 7:
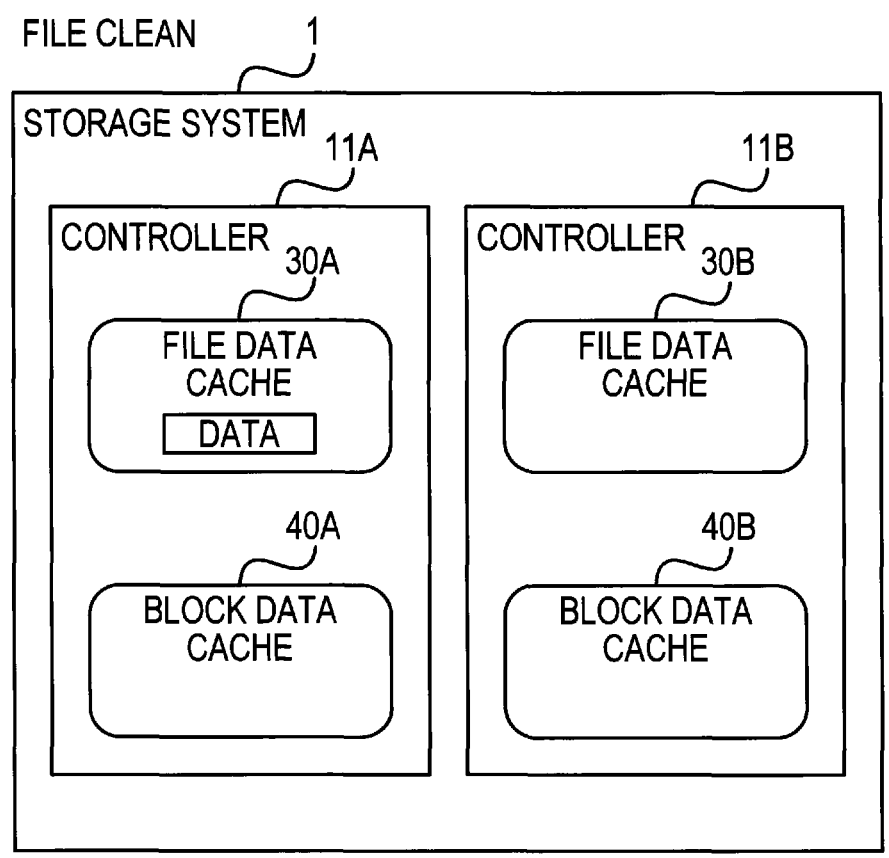
FIG. 7 is an explanatory diagram illustrating states of a cache area according to the first embodiment of this invention.

FIG. 7 illustrates a state "File Clean". The File Clean state is a state in which the data that can be erased without any problem is stored only in the file data cache area 30A. The wording "that can be erased without any problem" represents a state in which the most recent data is stored on the drive 26.

Figure 8:
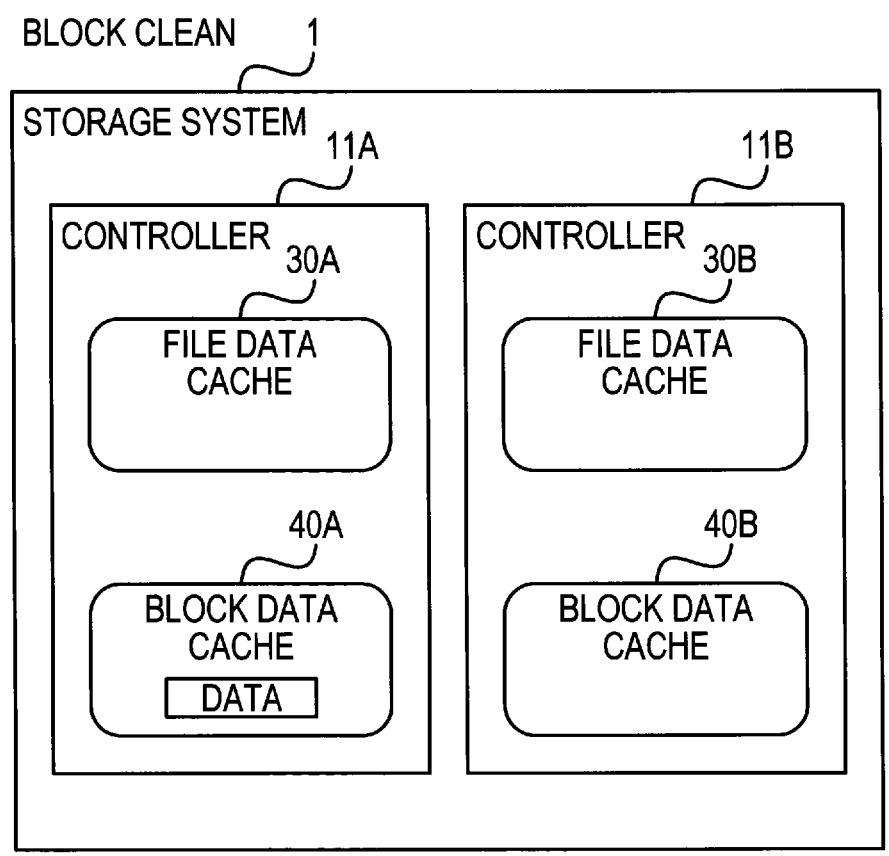
FIG. 8 is an explanatory diagram illustrating states of a cache area according to the first embodiment of this invention.

FIG. 8 illustrates a state "Block Clean". The Block Clean state is a state in which the data that can be erased without any problem is stored only in the block data cache area 40A.

Figure 9:
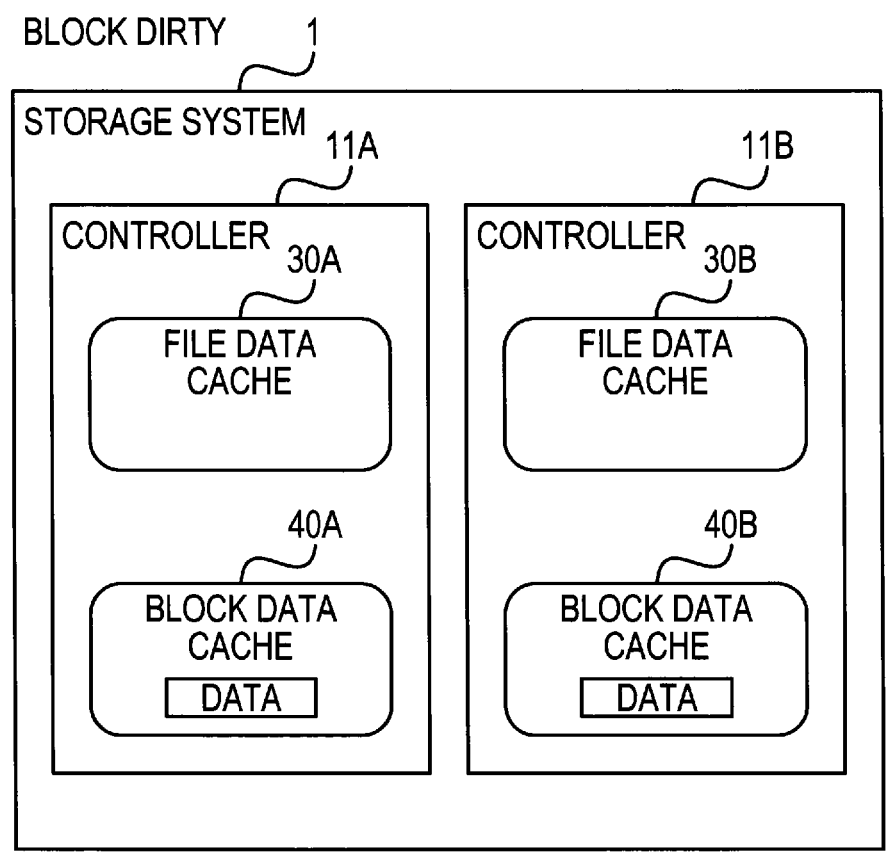
FIG. 9 is an explanatory diagram illustrating states of a cache area according to the first embodiment of this invention.

FIG. 9 illustrates a state "Block Dirty". The Block Dirty state is a state in which data that has not yet been written to the drive 26 is duplexed into and stored in the block data cache areas 40A and 40B. The data is written to the drive 26 asynchronously with the read/write from the host computer in a case where there is room for load to be imposed on the storage system, a case where capacities of the block data cache areas 40A and 40B become short, or other such case.

FIG. 10 is a diagram illustrating an example of actions and new states in cases where events occur in the respective states illustrated in FIG. 6 to FIG. 9.

A "current state" represents each of the above-mentioned four states. An "event" represents an event serving as a trigger for the processing executed by the storage system. For example, "File Read" indicates that the file I/O interface 12 receives the read request from the host computer 21 or the like. "File Write" indicates that the file I/O interface 12 receives the write request from the host computer 21 or the like. "Block Read" indicates that the block I/O interface 13 receives the read request. "Block Write" indicates that the block I/O interface 13 receives the write request. "Destage Compl." indicates that the data that has not yet been written to the drive 26 is written to the drive 26. "File Replaced" indicates that the area in which the data is stored is released due to the short capacity of the file data cache area 30A or other reasons. "Block Replaced" indicates that the area in which the data is stored is released due to the short capacity of the block data cache area 40A or other reasons.

When the file I/O interface 12 receives the file read request with the current state being "None", the requested data needs to be read from the drive 26. In this case, as illustrated in FIG. 3, the read data is directly stored in the file data cache area 30A, and the data cached in the file data cache area 30A is returned to the host computer 21. The data read from the drive 26 is not stored in the block data cache area 40A. Then, the data remains only in the file data cache area 30A, and hence the new state becomes "File Clean".

When the file I/O interface 12 receives the file write request with the current state being "None", the data to be written is duplexed by the two controllers so as not to be lost. The data is duplexed on a block storage side, and hence, after storing the data in the file data cache area 30A, the file operation VM 3 issues the write request to the block operation VM 4. When receiving the write request, the block operation VM 4 writes the data to the two block data cache areas 40A and 40B. The area in which the data to be written is stored within the file data cache area 30A is released after processing for writing the data to the block data cache areas 40A and 40B is completed. Then, the new state becomes "Block Dirty".

When the block I/O interface 13 receives a block read request with the current state being "None", because it suffices to directly respond to the host computer 21 from a block storage, the read data is stored in the block data cache area 40A, and the data cached in the block data cache area 40A is returned to the host computer 21. Then, the data is stored only in the block data cache area 40A, and hence the new state becomes "Block Clean".

When the block I/O interface 13 receives a block write request with the current state being "None", the data to be written is duplexed in the block data cache areas 40A of the two controllers so as not to be lost. Then, the new state becomes "Block Dirty".

When the state is "None", the following do not occur: drive write completion; the release of the area due to the short capacity of the file data cache area 30A or other reasons; and the release of the area due to the short capacity of the block data cache area 40A or other reasons.

When the file I/O interface 12 receives the file read request with the current state being "File Clean", the requested data is cached in the file data cache area 30A, and hence the data cached in the file data cache area 30A is returned to the host computer 21. The data cached in the file data cache area 30A is retained as it is. Then, the new state is maintained at "File Clean".

When the file I/O interface 12 receives the file write request with the current state being "File Clean", the data to be written is duplexed by the two controllers so as not to be lost. The data is duplexed on a block storage side, and hence, after storing the data in the file data cache area 30A, the file operation VM 3 issues the write request to the block operation VM 4. The block operation VM 4 writes the data to be written to the two block data cache areas 40A and 40B. The area in which the data to be written is stored within the file data cache area 30A is released after the writing of the data with respect to the block data cache areas 40A and 40B is completed. Then, the new state becomes "Block Dirty". This prevents both the file data cache area 30A and the block data cache area 40A from retaining the same data.

When the block I/O interface 13 receives the block read request with the current state being "File Clean", the block operation VM 4 requests the file operation VM 3 for the data, stores the acquired data in the block data cache area 40A, and returns the data cached in the block data cache area 40A to the host computer 21. Further, the file operation VM 3 discards the data cached in the file data cache area 30A. Then, the new state becomes "Block Clean". This prevents both the file data cache area 30A and the block data cache area 40A from retaining the same data, and enables the data to be returned as soon as the block read request is received again.

When the block I/O interface 13 receives the block write request with the current state being "File Clean", the data to be written is duplexed by the two controllers so as not to be lost. Therefore, the block operation VM 4 writes the data to be written to the two block data cache areas 40A and 40B. Further, the block operation VM 4 notifies the file operation VM 3 that the data cached in the file data cache area 30A be discarded. The file operation VM 3 discards the data cached in the file data cache area 30A. Then, the new state becomes "Block Dirty". This prevents old data from remaining in the file data cache area 30A and prevents both the file data cache area 30A and the block data cache area 40A from retaining the same data.

When data destage due to the short capacity of the file data cache area 30A or other reasons occurs with the current state being "File Clean", the data is discarded, and the state shifts to "None".

When the state is "File Clean", the drive write completion or the release of the area due to the short capacity of the block data cache area 40A or other reasons does not occur.

When the file I/O interface 12 receives the file read request with the current state being "Block Clean", the requested data is cached in the block data cache area 40A, and hence the data is returned from the block data cache area 40A. Therefore, the file operation VM 3 requests the block operation VM 4 to transfer the data. The block operation VM 4 reads the data from the block data cache area 40A, and returns the data to the file operation VM 3. Then, the file operation VM 3 stores the received data in the file data cache area 30A, and returns the data to the host computer 21. Further, the block operation VM 4 discards the data cached in the block data cache area 40A. Then, the new state becomes "File Clean". This improves responsiveness to the subsequent file read request, and prevents both the file data cache area 30A and the block data cache area 40A from retaining the same data.

When the file I/O interface 12 receives the file write request with the current state being "Block Clean", the data to be written is duplexed by the two controllers so as not to be lost. The data is duplexed on a block storage side, and hence, after storing the data in the file data cache area 30A, the file operation VM 3 issues the write request to the block operation VM 4. The block operation VM 4 writes the data to be written to the two block data cache areas 40A and 40B. The area in which the data to be written is stored within the file data cache area 30A is released after the writing of the data with respect to the block data cache areas 40A and 40B is completed. Then, the new state becomes "Block Dirty".

When the block I/O interface 13 receives the block read request with the current state being "Block Clean", the requested data is cached in the block data cache area 40A, and hence the block operation VM 4 returns the requested data to the host computer 21 as it is. Then, the new state is maintained at "Block Clean".

When the block I/O interface 13 receives the block write request with the current state being "Block Clean", the data to be written is duplexed by the two controllers so as not to be lost. Therefore, the block operation VM 4 writes the data to be written to the two block data cache areas 40A and 40B. Then, the new state becomes "Block Dirty".

When the state is "Block Clean", the drive write completion or the release of the area due to the short capacity of the file data cache area 30A or other reasons does not occur.

When data destage due to the short capacity of the block data cache area 40A or other reasons occurs with the current state being "Block Clean", the data is discarded, and the state shifts to "None".

When the file I/O interface 12 receives the file read request with the current state being "Block Dirty", the response is quickly made to the host computer 21 while the duplexed data is retained. Therefore, the file operation VM 3 transmits the read request to the block operation VM 4. The block operation VM 4 returns the data cached in the block data cache area 40A to the file operation VM 3. The file operation VM 3 returns the data returned from the block operation VM 4 to the host computer 21. The area in which the data to be written is stored within the file data cache area 30A is released after the writing of the data with respect to the block data cache area 40A is completed. Then, the new state becomes "Block Dirty". This prevents both the file data cache area 30A and the block data cache area 40A from retaining the same data while maintaining the duplexed data.

When the file I/O interface 12 receives the file write request with the current state being "Block Dirty", the data to be written is duplexed by the two controllers so as not to be lost. The pre-update data cached in the block data cache areas 40A and 40B has already been duplexed, and hence those pieces of data are updated. Therefore, after storing the data to be written in the file data cache area 30A, the file operation VM 3 issues the write request to the block operation VM 4. The block operation VM 4 writes the data to be written to the two block data cache areas 40A and 40B. The area in which the data to be written is stored within the file data cache area 30A is released after the writing of the data with respect to the block data cache areas 40A and 40B is completed. Then, the "Block Dirty" state is maintained.

When the block I/O interface 13 receives the block read request with the current state being "Block Dirty", the requested data is cached in the block data cache area 40A, and hence the block operation VM 4 returns the requested data to the host computer as it is. Then, the "Block Clean" state is maintained.

When the block I/O interface 13 receives the block write request with the current state being "Block Dirty", the data to be written is duplexed by the two controllers so as not to be lost. The pre-update data cached in the block data cache areas 40A and 40B has already been duplexed, and hence those pieces of data are updated. Therefore, the block operation VM 4 writes the data to be written to the two block data cache areas 40A and 40B. Then, the state "Block Dirty" is maintained.

When the destage of the data with respect to the drive 26 is completed with the current state being "Block Dirty", it is not necessary to maintain the duplexed state. Therefore, one piece of the duplexed data is discarded. Then, the new state becomes "Block Clean".

Further, when the current state is "Block Dirty", the file data cache area 30A does not store data, and hence the release due to the short capacity of the file data cache area 30A or other reasons does not occur. Further, the block data cache area 40A is necessary to retain the data, and hence the release due to the capacity deficiency thereof or other reasons does not occur either.

Figure 11:
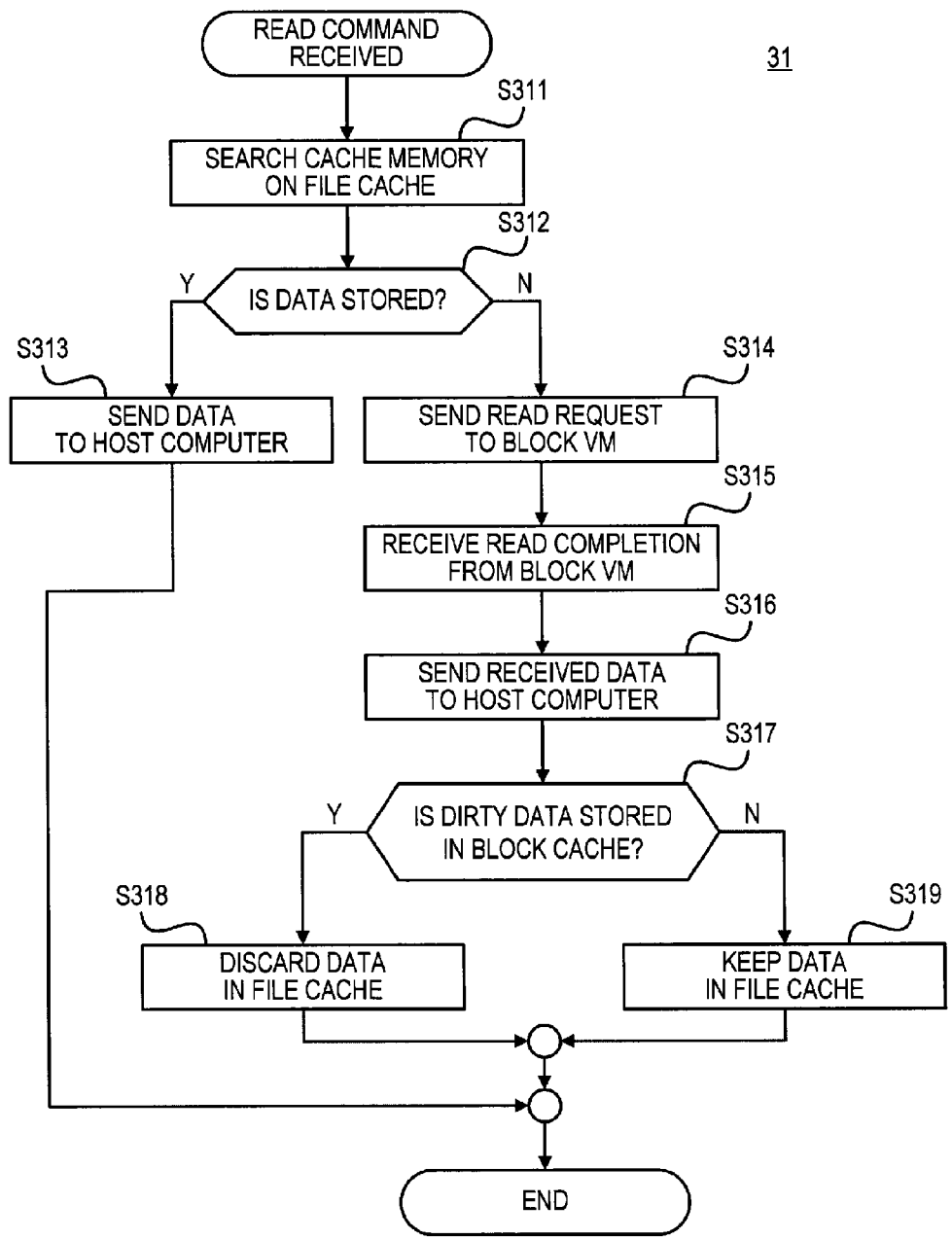
FIG. 11 is a flowchart of an example of a processing performed when receiving read request in the first embodiment of this invention.

FIG. 11 is a flowchart of an example of a processing performed when the file operation VM 3 receives the read request in the first embodiment.

When the file I/O interface 12 receives the file read request from the host computer 21, the file operation VM 3 first searches the file data cache area 30A to determine whether or not the requested data is stored therein (S311).

When the requested data is cached in the file data cache area 30A ("Y" in S312), the file operation VM 3 returns the data stored in the file data cache area 30A to the host computer 21 (S313), and brings the processing to an end.

On the other hand, when the requested data is not stored in the file data cache area 30A ("N" in S312), the file operation VM 3 requests the block operation VM 4 for the data (S314). Then, the file operation VM 3 receives the response from the block operation VM 4 (S315), and returns the received data to the host computer (S316). Then, the file operation VM 3 refers to information included in the response to determine whether or not the block data cache area 40A stores the data of a dirty state (S317).

When the block data cache area 40A stores dirty data ("Y" in S317), the block data cache area 40A stores the duplexed data, and hence, in order to prevent the data from being retained in a duplicate manner, the file operation VM 3 discards the data cached in the file data cache area 30A (S318), and brings the processing to an end.

On the other hand, when the dirty data is not stored in the block data cache area 40A ("N" in S317), the data is not retained on the block operation VM 4 side, and hence the file operation VM 3 retains the date within the file data cache area 30A (S319), and brings the processing to an end.

Figure 12:
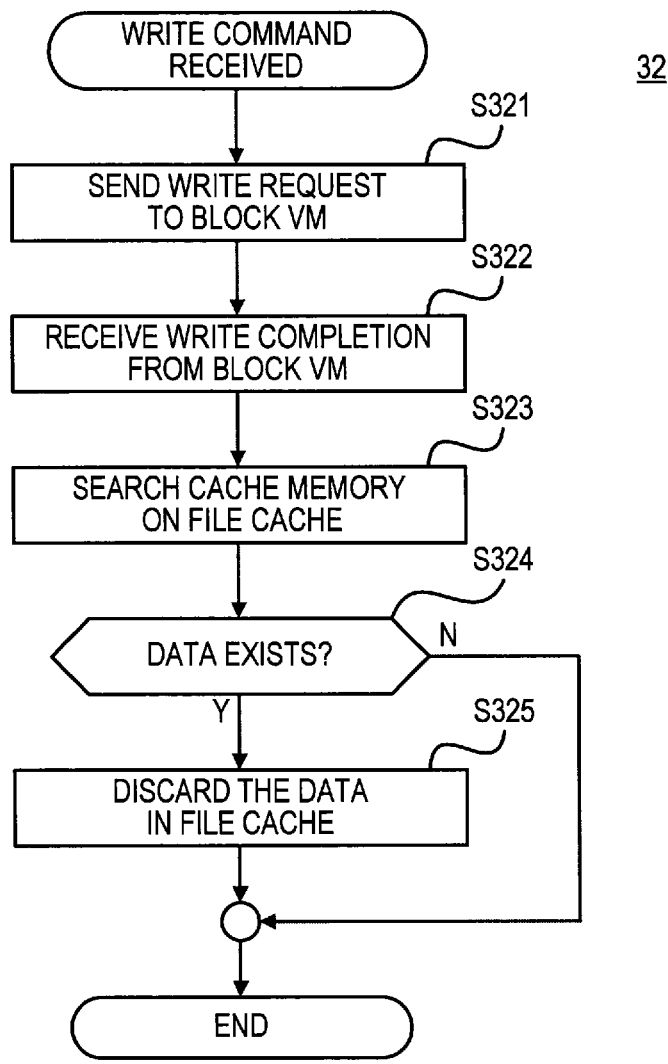
FIG. 12 is a flowchart of an example of a processing performed when a file operation VM receives a write request in the first embodiment of this invention.

FIG. 12 is a flowchart of an example of a processing performed when the file operation VM 3 receives the write request in the first embodiment.

When the file I/O interface 12 receives the file write request from the host computer 21, the file operation VM 3 first transmits the write request to the block operation VM 4 (S321), and waits for the write completion to be returned from the block operation VM 4 (S322).

After that, the file operation VM 3 searches the file data cache area 30A to determine whether or not the cache data corresponding to the data to be written is stored therein (S323). When the cache data is stored in the file data cache area 30A ("Y" in S324), which means that the data is retained in a duplicate manner, the cache data stored in the file data cache area 30A is discarded (S325), and the processing is brought to an end.

On the other hand, when the cache data is not stored in the file data cache area 30A ("N" in S324), the processing is brought to an end.

Figure 13:
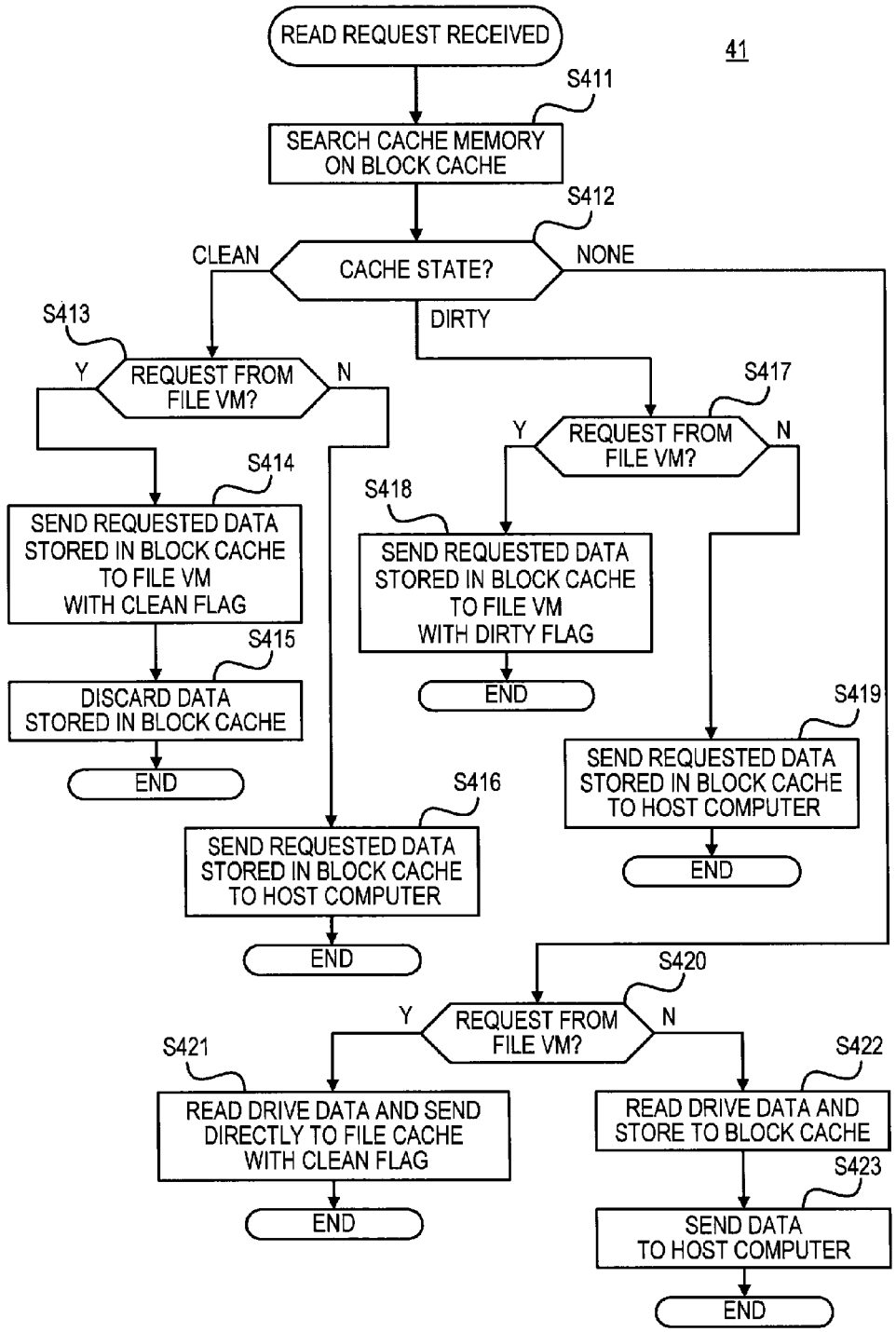
FIG. 13 is a flowchart of an example of a processing performed when the file operation VM receives a read request in the first embodiment of this invention.

FIG. 13 is a flowchart of an example of a processing performed when the file operation VM 4 receives the read request in the first embodiment.

When receiving the block read request from the file operation VM 3 or the host computer, the block operation VM 4 first searches the block data cache area 40A to determine whether or not the requested data is stored therein (S411). The state of the requested data acquired by the search has the following three types: (1) the state (Clean) in which the requested data is cached in the block data cache area 40A and is synchronized with the data stored on the drive 26; (2) the state (Dirty) in which the requested data is cached in the block data cache area 40A and is not synchronized with the data stored on the drive 26 with the most recent data being stored in the block data cache area 40A; and (3) the state (None) in which the requested data is not cached in the block data cache area 40A.

The block operation VM 4 determines the above-mentioned three types of state (S412).

When a cache state is "Clean", the block operation VM 4 determines whether or not a request source is the file operation VM 3 (S413). When the request source is the file operation VM 3 ("Y" in S413), the block operation VM 4 adds a flag indicating that the state of the cache is "Clean" to the data cached in the block data cache area 40A, and transmits the data to the file operation VM 3 (S414). Then, the data to be read is stored in the file data cache area 30A by the file operation VM 3, and hence, in order to prevent the data from being retained in a duplicate manner, the block operation VM 4 discards the data to be read which is cached in the block data cache area 40A (S415), and brings the processing to an end.

On the other hand, when the request source is not the file operation VM 3, in other words, when the read request is the request issued from the host computer 21 ("N" in S413), the block operation VM 4 returns the data to the host computer 21 (S416), and brings the processing to an end. At this time, the cache data is retained in the block data cache area 40A in preparation for the next reception of the block read request.

Further, when the cache state is "Dirty", the block operation VM 4 determines whether or not the request source is the file operation VM 3 (S417). When the request source is the file operation VM 3 ("Y" in S417), the block operation VM 4 adds a flag indicating that the state of the cache is "Dirty" to the data cached in the block data cache area 40A, and transmits the data to the file operation VM 3 (S418). This prevents the data from being stored in the file data cache area 30A. Then, the block data cache area 40A brings the processing to an end while retaining the cache data.

On the other hand, when the request source is not the file operation VM 3, in other words, when the read request is the request issued from the host computer 21 ("N" in S417), the block operation VM 4 returns the data to the host computer 21 (S419), and brings the processing to an end. At this time, the cache data is not written on the drive 26, and hence the data is kept retained in the block data cache area 40A.

Further, when the cache state is "None", the block operation VM 4 determines whether or not the request source is the file operation VM 3 (S420). When the request source is the file operation VM 3, the block operation VM 4 stores the data to be read in the file data cache area 30A without a need to store the data in the block data cache area 40A. Therefore, the block operation VM 4 adds the flag indicating that the state of the cache is "Clean" to the data read from the drive 26, and transmits the data directly to the file data cache area 30A (S421). Accordingly, the data is retained in the file data cache area 30A. Then, the processing is brought to an end.

On the other hand, when the request source is not the file operation VM 3, in other words, when the read request is the request issued from the host computer 21 ("N" in S420), the block operation VM 4 stores the data read from the drive 26 in the block data cache area 40A (S422). Then, the block operation VM 4 returns the data cached in the block data cache area 40A to the host computer 21 (S423). Accordingly, the data is retained in the block data cache area 40A, and when the read request is received again, the data is allowed to be returned to the host computer 21 without access to the drive 26.

Figure 14:
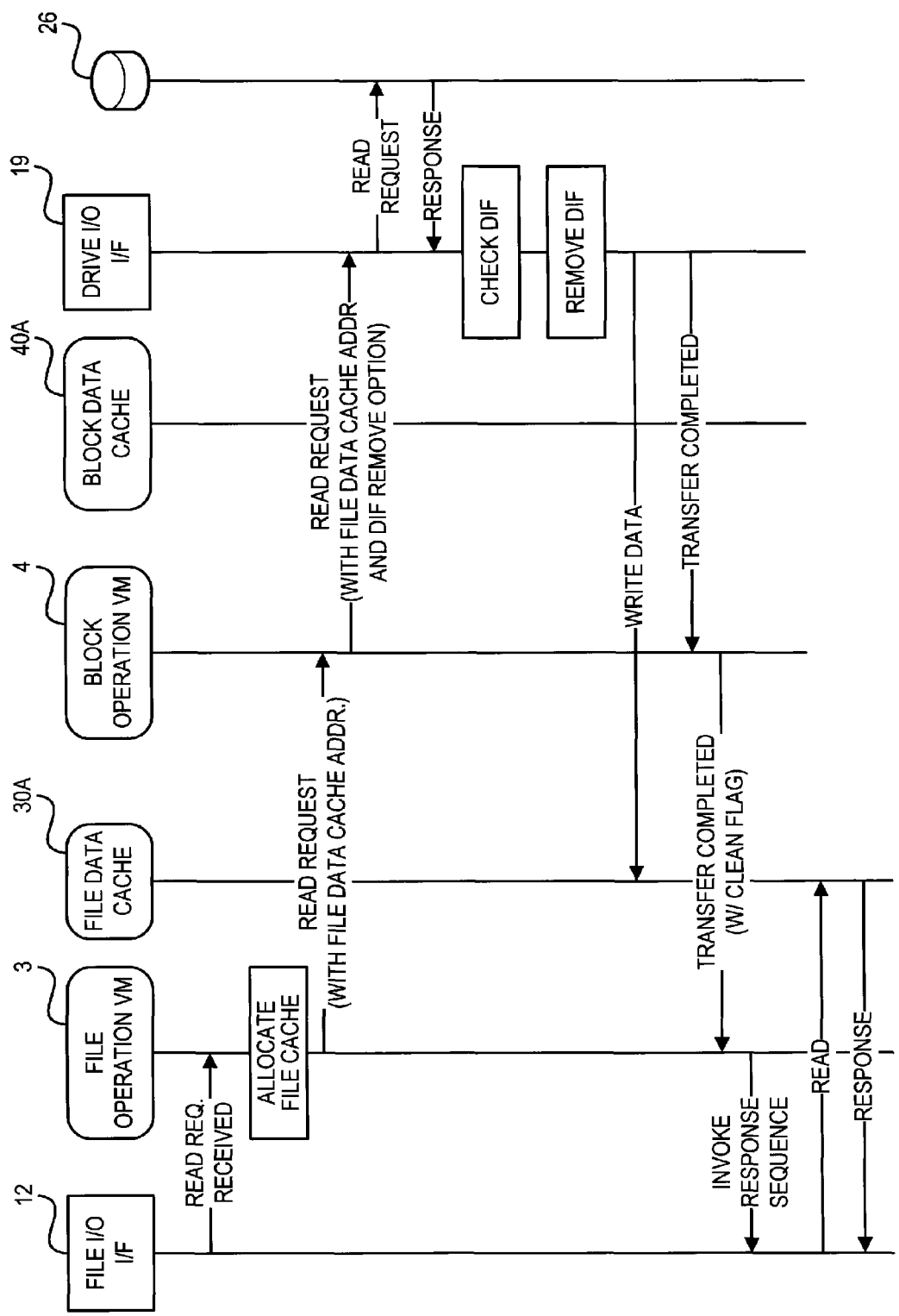
FIG. 14 is a sequence diagram of processing performed when a file read request is received from the host computer according to the first embodiment of this invention.

FIG. 14 is a sequence diagram of processing performed when the file read request is received from the host computer 21 according to the first embodiment. The processing illustrated in FIG. 14 represents an example of transactions carried out in a case where, after the host computer 21 issues the file read request to the storage system 1, the requested data is not cached in any one of the file data cache area 30A and the block data cache area 40A and the data to be read which has been read from the drive 26 is to be returned to the host computer 21.

The file operation VM 3 is notified of the file read request issued from the host computer 21 through the file I/O interface 12. When receiving the notification that the read request has been received, the file operation VM 3 reserves, in the memory 15, an area for caching the requested file data, and issues the read request to the block operation VM 4. The read request issued to the block operation VM 4 includes an address of the file data cache area 30A in which the data is stored.

When receiving the read request, the block operation VM 4 transmits the read request to the drive I/O interface 19. The read request issued to the drive I/O interface 19 includes the address of the file data cache area 30A which has been received from the file operation VM 3, the address being the storage destination of the data. Further, the read request includes a command to remove the DIF.

When receiving the read request, the drive I/O interface 19 issues the read request to the drive 26, and reads the data from the drive 26. After that, the drive I/O interface 19 checks and removes the DIF, and writes the data to the file data cache area 30A. After the data is written, the drive I/O interface 19 notifies the block operation VM 4 of the data transfer completion.

When receiving the data transfer completion notification, the block operation VM 4 notifies the file operation VM 3 of the data transfer completion. The data transfer completion notification issued to the file operation VM 3 includes information indicating that data is not cached in the block data cache area 40A.

When receiving the data transfer completion notification, the file operation VM 3 commands the file I/O interface 12 to return the response to a host.

When receiving a response return command, the file I/O interface 12 reads the data from the file data cache area 30A, and returns the read data to the host computer 21.

In this manner, in the case where the file operation VM 3 reads the data from the drive 26 via the block operation VM 4, the block data cache area 40A is not used. This can inhibit the area of the memory from being consumed. Further, the processing in which the block operation VM 4 reserves the area of the memory can be omitted, and a processor processing amount can be reduced. In addition, it is possible to reduce time passing since the host computer 21 issues the request until receiving the data.

Figure 15:
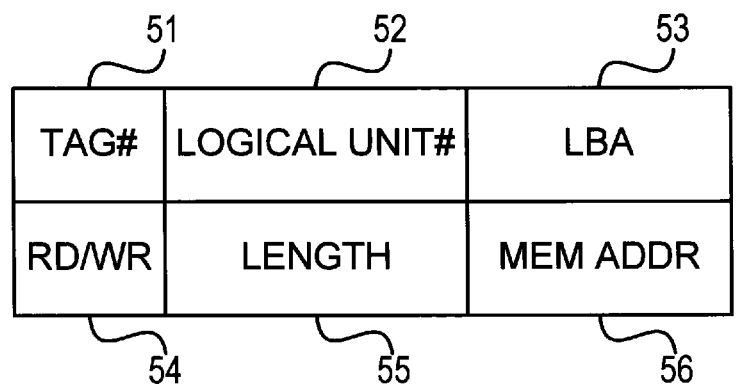
FIG. 15 is an explanatory diagram illustrating an example of a request issued to a block operation VM by the file operation VM in the first embodiment of this invention.

FIG. 15 is a diagram illustrating an example of the request issued to the block operation VM 4 by the file operation VM 3 in the first embodiment.

The request issued to the block operation VM 4 by the file operation VM 3 includes a TAG number 51, a LOGICAL UNIT number 52, an LBA 53, an RD/WR 54, a LENGTH 55, and an MEM ADDR 56.

The TAG number 51 is a number for identifying the request, and is used to identify the request in a case of issuing a plurality of requests. The LOGICAL UNIT number 52 is an identifier of a volume that stores the requested data. The LBA 53 is a logical block address within the volume in which the requested data is stored.

The RD/WR 54 is information indicating whether the request is the read request or the write request. The LENGTH 55 is a length of the requested data. The MEM ADDR 56 is an address of the file data cache area 30A in which the read data is to be stored or an address of the file data cache area 30A in which the data to be written is stored.

Figure 16:
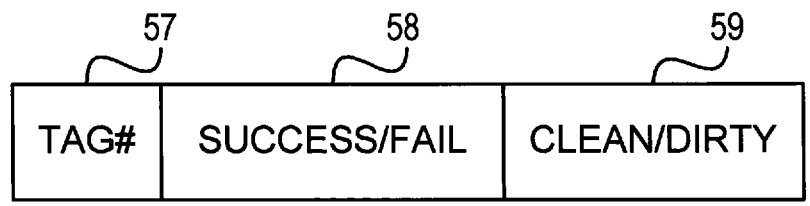
FIG. 16 is an explanatory diagram illustrating an example of a response returned to the file operation VM by the block operation VM in the first embodiment of this invention.

FIG. 16 is a diagram illustrating an example of the response returned to the file operation VM 3 by the block operation VM 4 in the first embodiment.

The response returned to the file operation VM 3 by the block operation VM 4 includes a TAG number 57, a SUCCESS/FAIL 58, and a CLEAN/DIRTY 59.

The TAG number 57 is an identifier indicating the request corresponding to the response. The SUCCESS/FAIL 58 is information indicating whether the processing has been successful or has failed. As the CLEAN/DIRTY 59, "DIRTY" is set in the case where the data is cached in the block data cache area 40A, and "CLEAN" is set in the case where the data is not cached in the block data cache area 40A. The CLEAN/DIRTY 59 is used to determine whether or not the data is to be retained in the file data cache area 30A.

As described above, according to the first embodiment of this invention, it is possible to suppress overlapping cache of the same data in the file storage and the block storage, and to put the capacity of the cache memory to effective use. Therefore, a cache hit rate improves, and it is possible to improve the performance of the storage system.

For example, when there is a cache hit at a time of the read request, the processing is completed only on a file storage side, and hence it is possible to reduce the processing amount of the processor, which can improve the performance of the storage system. Further, when there is a cache miss at the time of the read request, cache processing for the block storage and the data transfer performed from the block storage to the file storage are omitted, and hence it is possible to reduce memory access and the processor processing amount, which can improve the performance of the storage system.

Example 2

Next described is a second embodiment of this invention.

In the second embodiment, unlike the first embodiment for eliminating the caching of the data in both the file data cache area 30A and the block data cache area 40A, the dirty data that has not yet been written to the drive 26 is retained in the block data cache area 40A, and the cache data is also retained in the file data cache area 30A, to thereby improve the performance of the storage system.

The second embodiment is described below mainly by taking different points from the first embodiment. It should be noted that the same components as those of the above-mentioned first embodiment are denoted by the same reference symbols, and descriptions thereof are omitted.

FIG. 17 is a diagram illustrating an example of actions and new states in cases where events occur in the second embodiment.

Newly set in the second embodiment is a "File Clean Block Dirty" state in which a clean cache is retained in the file data cache area 30A and the data is duplexed into the block data cache areas 40A and 40B. The underlined items are different from the first embodiment.

In the second embodiment, irrespective of the current state, when the file I/O interface 12 receives the file write request from the host computer 21, in order to prevent a data loss, the data to be written is duplexed into and retained in the block data cache areas 40A and 40B. In addition, the data is also stored in the file data cache area 30A so that the data can be returned to the host computer 21 only by the file operation VM 3 when the file read request is received again. Then, the new state becomes "File Clean Block Dirty".

When the file I/O interface 12 receives the file read request with the current state being "Block Dirty", the file operation VM 3 issues the read request for the data to the block operation VM 4, stores the received data in the file data cache area 30A, and returns the data to the host computer 21. At this time, the data stored in the file data cache area 30A is retained as it is so that the response can be returned only by the file operation VM 3 when the file read request is received again, which can speed up the processing. In this case, the data is stored in the file data cache area 30A, while the data is also stored in the block data cache areas 40A and 40B, and hence the new state becomes "File Clean Block Dirty".

When the file I/O interface 12 receives the file read request with the current state being "File Clean Block Dirty", the file operation VM 3 returns the data cached in the file data cache area 30A to the host computer 21. Then, the "File Clean Block Dirty" state is maintained. In this case, the file operation VM 3 returns the data from the file data cache area 30A, and the block operation VM 4 does not execute the processing. Therefore, a response time can be reduced.

When the file I/O interface 12 receives the file write request with the current state being "File Clean Block Dirty", the file operation VM 3 updates the content of the file data cache area 30A, and issues the write request to the block operation VM 4. The block operation VM 4 updates the data stored in the block data cache areas 40A and 40B. Then, the "File Clean Block Dirty" state is maintained.

When the block I/O interface 13 receives the block read request with the current state being "File Clean Block Dirty", the block operation VM 4 returns the data cached in the block data cache area 40A to the host computer 21. Then, the "File Clean Block Dirty" state is maintained.

When the block I/O interface 13 receives the file write request with the current state being "File Clean Block Dirty", the block operation VM 4 updates the data cached in the block data cache area 40A. Then, the data cached in the file data cache area 30A becomes old data, and hence the block operation VM 4 commands the file operation VM 3 to discard the data cached in the file data cache area 30A. The file operation VM 3 discards the data cached in the file data cache area 30A. Then, the state shifts to "Block Dirty". This flow prevents the old cached data from being referred to when the host computer 21 issues the file read request.

When the writing of the data to the drive 26 has been completed with the current state being "File Clean Block Dirty", it is not necessary to retain the cache data in the block data cache areas 40A and 40B. Therefore, both pieces of data duplexed in the block data cache areas 40A and 40B are discarded. Then, the new state becomes "File Clean".

When the destage due to the capacity deficiency of the file data cache area 30A or other reasons occurs with the current state being "File Clean Block Dirty", the file operation VM 3 simply discards the data cached in the file data cache area 30A. Then, the new state becomes "Block Dirty".

As described above, in the second embodiment of this invention, the file data cache area 30A and the block data cache area 40A are simultaneously used as a read cache and as a write cache, respectively, which can enhance the responsiveness to the file read request compared with the first embodiment. Therefore, it is possible to improve the performance particularly in a case where there is room for the capacity of the cache memory and in a case where the file access frequently occurs.

Example 3

Next described is a third embodiment of this invention. The third embodiment is an example of an access method for improving the performance of the block access in a case where an application VM 6 for handling the block storage and the block operation VM 4 are provided within one device.

In the above-mentioned unified storage system according to the first embodiment, the function of realizing the file access (file operation VM 3) and the function of realizing the block access (block operation VM 4) are provided within one device, and a method of accessing the drive 26 always via the block data cache area 40A even at the time of the file access is conceivable as illustrated in FIG. 2.

Figure 18:
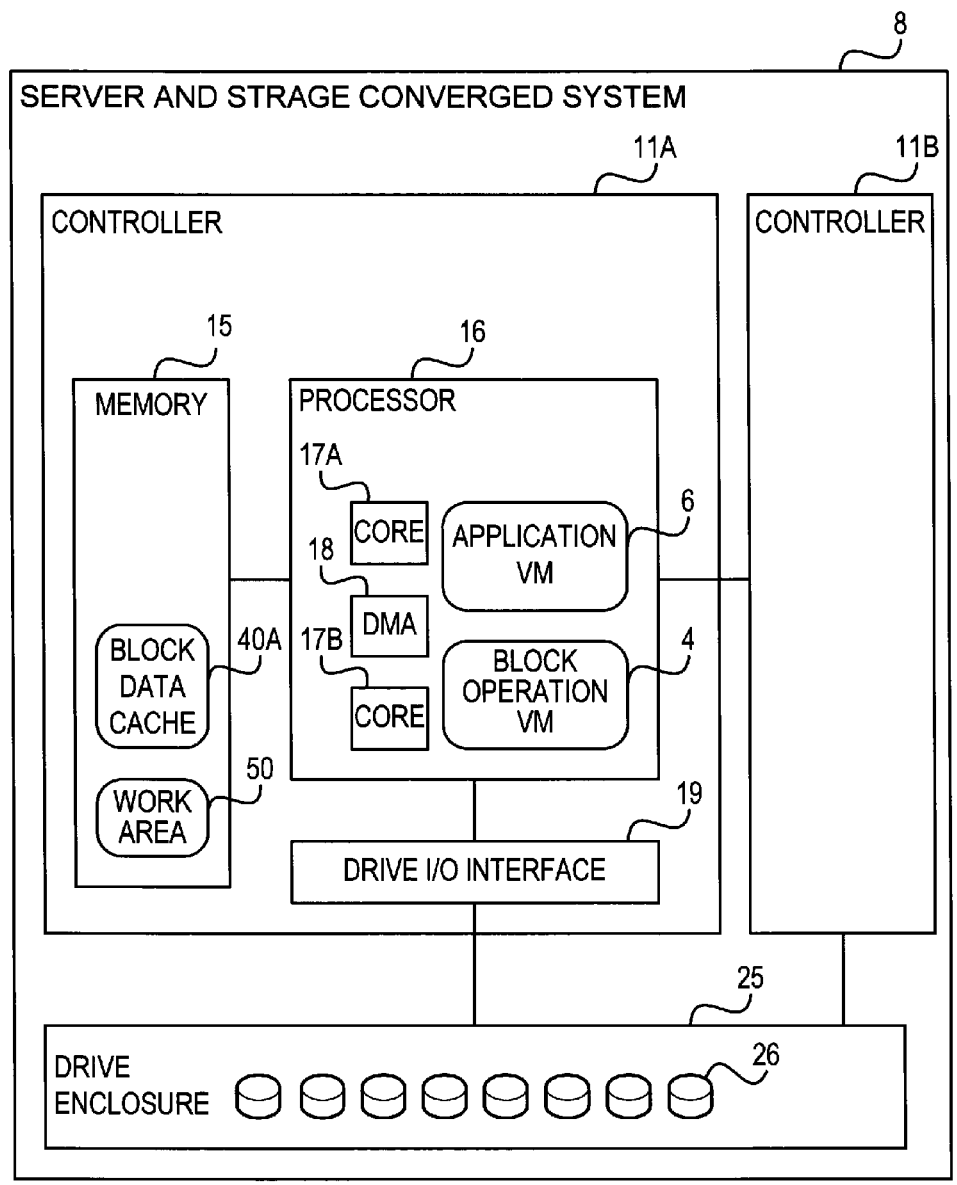
FIG. 18 is a block diagram illustrating an example of a computer system including a server and storage converged system according to a third embodiment of this invention.

However, as in a server and storage converged system 8 according to the third embodiment, in the case where an application program (application VM 6) for block-accessing the data stored on the drive 26 and the function of performing the block access (block operation VM 4) are provided within one device as illustrated in FIG. 18, it may sometimes be better to transfer the data directly from the drive I/O interface 19 (drive 26) to the application VM 6. Even in such a case, when the data is transferred via the block data cache area 40A, the area of the cache memory is wasted, and the resource of the processor 16 is consumed for the control of the input/output of the data to/from the memory 15. On the other hand, when the data is always transferred directly from the drive I/O interface 19 (drive 26) to the application VM 6, the cache function is not used, which deteriorates the access performance with respect to the drive 26.

Therefore, in the third embodiment, the cache effect at the time of the block access and the access performance with respect to the disk are simultaneously realized.

The third embodiment is described below mainly by taking different points from the first embodiment. It should be noted that the same components as those of the first embodiment described above are denoted by the same reference symbols, and descriptions thereof are omitted.

FIG. 18 is a block diagram illustrating an example of a computer system including the server and storage converged system 8 according to the third embodiment of this invention.

In the third embodiment, the processor 16 of the server and storage converged system 8 executes the application VM 6 and the block operation VM 4. The application VM 6 is an application program for block-accessing the data stored on the drive 26 in accordance with the request issued from the host computer, and is, for example, a database management system.

It should be noted that, in the storage system according to this embodiment, the application function and the block storage function are realized by the virtual machines, but may be realized instead by an application program for providing each of the functions.

Figure 19:
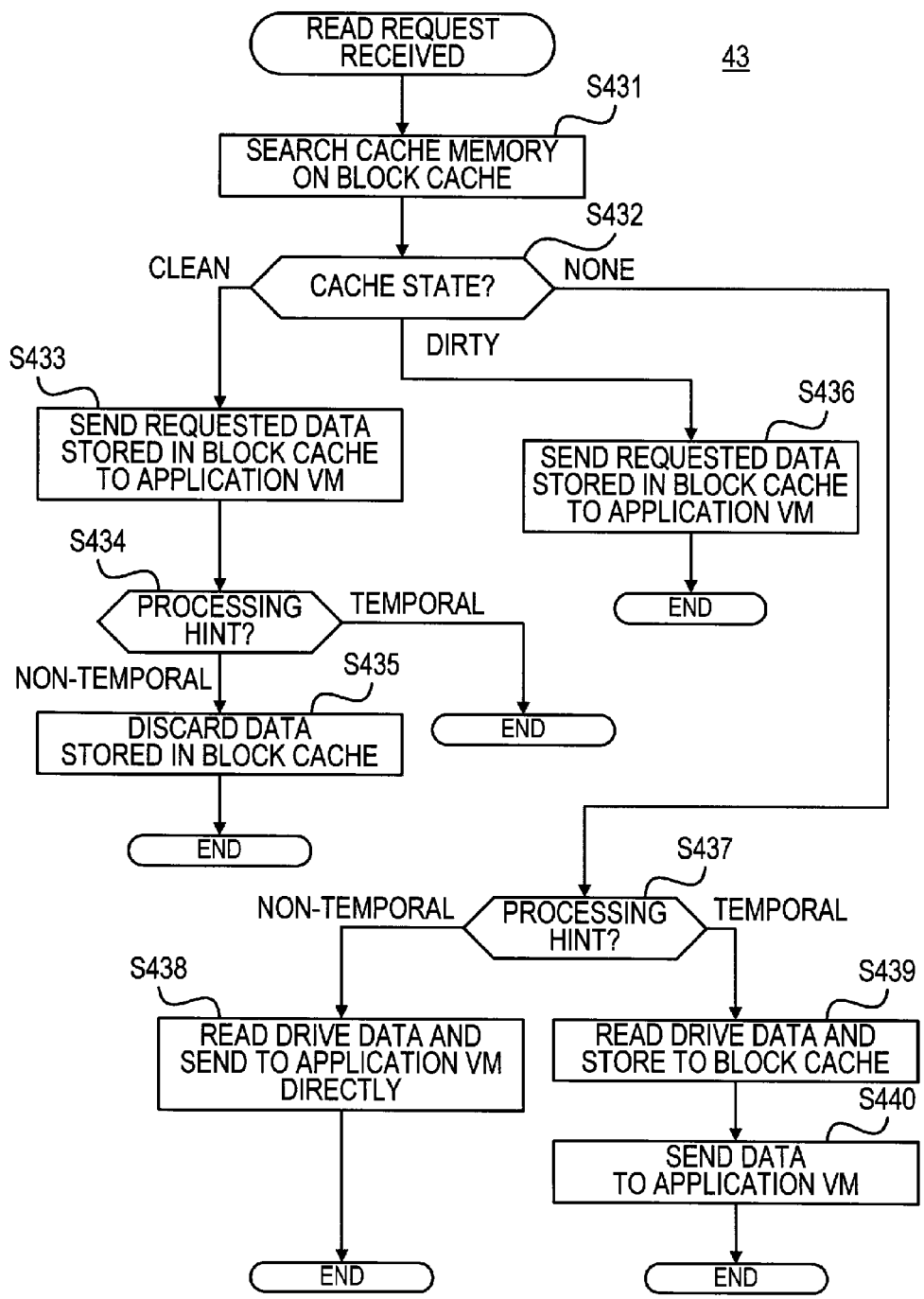
FIG. 19 is a flowchart of an example of processing performed when a block operation VM receives a read request in the third embodiment of this invention.

FIG. 19 is a flowchart of an example of processing performed when the block operation VM 4 receives the read request in the third embodiment.

It should be noted that the read request issued to the block operation VM 4 by the application VM 6 according to the third embodiment includes information on a Processing Hint indicating locality in addition to the information indicating the address, a volume number, a transfer length, and the like illustrated in FIG. 15. The Processing Hint assumes a value of any one of "Temporal" exhibiting a locality and a high possibility of being immediately referred to again and "Non-Temporal" exhibiting a low locality and a low possibility of being referred to again. When the application program running on the application VM 6 issues the read request, the read request is issued by assigning "Temporal" to data having a high possibility of being referred to again and "Non-Temporal" to data having a low possibility of being referred to again.

When receiving the read request, the block operation VM 4 first searches the block data cache area 40A to determine whether or not the requested data is stored therein (S431). The state of the requested data acquired by the search has the following three types: (1) the state (Clean) in which the requested data is cached in the block data cache area 40A and is synchronized with the data stored on the drive 26; (2) the state (Dirty) in which the requested data is cached in the block data cache area 40A and is not synchronized with the data stored on the drive 26 with the most recent data being stored in the block data cache area 40A; and (3) the state (None) in which the requested data is not cached in the block data cache area 40A.

The block operation VM 4 determines the above-mentioned three types of state (S432).

When the cache state is "Clean", the block operation VM 4 transmits the data cached in the block data cache area 40A to the application VM 6 (S433). Then, the block operation VM 4 refers to the Processing Hint included in the read request issued from the application VM 6 (S434), and when the Processing Hint is "Temporal", the processing is brought to an end. On the other hand, when the Processing Hint is "Non-Temporal", the data cached in the block data cache area 40A is discarded (S435). This prevents the data having a low possibility of being referred to again from occupying the block data cache area 40A.

Further, when the cache state is "Dirty", the block operation VM 4 transmits the data cached in the block data cache area 40A to the application VM 6 (S436), and brings the processing to an end. In this case, it is necessary to retain the data duplexed in the block data cache areas 40A and 40B, and hence the data cached in the block data cache area 40A is not discarded irrespective of the content of the Processing Hint.

Further, when the cache state is "None", the requested data is not cached in the block data cache area 40A, and hence the block operation VM 4 refers to the Processing Hint (S437). Then, when the Processing Hint is "Non-Temporal", the block operation VM 4 read the data stored on the drive 26, and transfers the read data directly to the application VM 6 (S438). On the other hand, when the Processing Hint is "Temporal", the data read from the drive 26 is stored in the block data cache area 40A (S439), and the data stored in the block data cache area 40A is transferred to the application VM 6 (S440). This prevents the data having a low possibility of being referred to again from occupying the block data cache area 40A, which can reduce the response time. Further, by storing the data having a high locality in the block data cache area 40A, the data cached in the block data cache area 40A is returned when the data is referred to again, which can improve the responsiveness.

As described above, according to the third embodiment of this invention, in the server and storage converged system 8, the cache effect at the time of the block access and the access performance with respect to the disk can be simultaneously realized.

While the present invention has been described in detail and pictorially in the accompanying drawings, the present invention is not limited to such detail but covers various obvious modifications and equivalent arrangements, which fall within the purview of the appended claims.

The invention claimed is:

1. A storage system comprising:
a storage device configured to store data, and
at least one controller configured to control reading/writing of the data from/to the storage device, wherein:
the at least one controller each includes
a processor configured to execute a program,
a memory configured to store the program executed by the processor, and
a cache memory including a first cache area and a second cache area,
the first cache area configured to temporarily store the data read from the storage device for file access, and
the second cache memory configured to temporarily store the data to be read/written from/to the storage device for block access;
the at least one controller each further includes
a first interface configured to receive, from a host computer, file access to data stored in the storage device, and
a second interface configured to receive, from the host computer, block access to data stored in the storage device;
the processor is configured to execute
a file access processing module configured to process the file access, and
a block access processing module configured to process the block access;
the file access processing module requests the block access processing module to read requested data from the storage device in response to data indicated by a file read request received via the first interface not being stored in the first cache area;

the block access processing module stores data read from the storage device, which is requested from the file access processing module, in the first cache area without storing the data in the second cache area;

the file access processing module transfers the data stored in the first cache area to the host computer, which has issued the file read request; and the block access processing module, in response to a block read request received via the second interface, stores data read from the storage device in the second cache area without storing the data in the first cache area.

2. The storage system according to claim 1, wherein:

the file access processing module notifies the block access processing module of an address of the first cache area to which the requested data is to be written, to thereby request the block access processing module to read the data from the storage device;

the block access processing module notifies a third interface of the address of the first cache area, to thereby request the third interface to read the data from the storage device; and the second interface removes an integrity code for detecting an error of the data read from the storage device.

3. The storage system according to claim 1, wherein the processor is further configured to:

store the data stored in the second cache area in the first cache area and transfer the data to the host computer in response to the data requested by the file read request being stored in both the storage device and the second cache area; and release a storage area of the second cache area in which the data requested to be read is stored.

4. The storage system according to claim 1, wherein the processor is further configured to:

store the data requested to be written in the second cache area in response to data subjected to a file write request received from the host computer being stored in both the storage device and the first cache area;

transfer the data requested to be written to another controller so as to be further stored in a second cache area of the another controller; and discard the data subjected to the file write request from the first cache area after storing the data requested to be written in the second cache area included in the controller and the second cache area included in the another controller.

5. The storage system according to claim 1, wherein the processor is further configured to:

store the data stored in the first cache area in the second cache area and transfer the data to the host computer in response to data requested to be read by a block data read request received from the host computer being stored in the first cache area; and discard the data requested to be read by the block data read request from the first cache area.

6. The storage system according to claim 1, wherein the processor is further configured to:

store the data requested to be written in the second cache area in response to data subjected to a block data write request received from the host computer being stored in the first cache memory;

transfer the data requested to be written to another controller so as to be further stored in a second cache area of the another controller; and discard the data subjected to the block data write request from the first cache area.

7. The storage system according to claim 1, wherein the processor stores data requested to be written by a file write request received from the host computer in both the first cache area and the second cache area.

8. The storage system according to claim 7, wherein the processor is further configured to:

store, when the data requested by the file read request received from the host computer is stored in the second cache area, the data stored in the second cache area in the first cache area and transfer the data to the host computer;

inhibit an area of the second cache area in which the data is stored from being released.

9. The storage system according to claim 7, wherein, in response to data subjected to a block data write request received from the host computer being stored in both the first cache area and the second cache area, the processor updates, in the second cache area, the data subjected to the block data write request and discards, from the first cache area, the data subjected to the block data write request.

10. A control method of controlling a storage system, the storage system including a storage device configured to store data, and at least one controller configured to control reading/writing of the data from/to the storage device, the at least one controller each including a processor configured to execute a program, a memory configured to store the program executed by the processor, a cache memory including a first cache area and a second cache area, the first cache area configured to temporarily store the data read from the storage device for file access, and the second cache area configured to temporarily store the data to be read/written from/to the storage device for block access, the at least one controller each further includes a first interface configured to receive, from a host computer, file access to the data stored in the storage device, and a second interface configured to receive, from the host computer, the block access to the data stored in the storage device, the control method including:

processing the file access by a file processing module, processing the block access by a block access module, requesting, by the file access processing module, the block access processing module to read the requested data from the storage device in response to the data indicated by a file read request received via the first interface not being stored in the first cache area, storing, by the block access processing module, data read from the storage device, which is requested from the file access processing module, in the first cache area, without storing the data in the second cache area, transferring, by the file access processing module, data stored in the first cache area to the host computer, which has issued the file read request, and in response to a block read request received via the second interface, storing, by the block access processing module, data read from the storage device in the second cache area without storing the data in the first cache area.

11. The control method according to claim 10, further including:
    notifying, by the file access processing module, the block access processing module of an address of the first cache area to which the requested data is to be written, to thereby request the block access processing module to read the data from the storage device;
    notifying, by the block access processing module, a third interface of the address of the first cache area, to thereby request the third interface to read the data from the storage device; and
    removing, by the second interface, an integrity code for detecting an error of the data read from the storage device.

12. The control method according to claim 10, further including a step of storing, by the processor, data requested to be written by a file write request received from the host computer in both the first cache area and the second cache area.

13. The storage system according to claim 1, wherein:
    the block access processing module determines whether or not the data read from the storage device is requested from the file access processing module based on a request source being the file access processing module.

14. An information processing system comprising:
    a storage system configured to store data; and
    an application virtual machine coupled to the storage system, wherein:
    the storage system includes a storage device configured to store data, and at least one controller configured to control reading/writing of the data from/to the storage device;
    the at least one controller each includes
        a processor configured to execute a program,
        a memory configured to store the program executed by the processor, and
        a cache memory including a first cache area and a second cache area,
        the first cache area being configured to temporarily store the data read from the storage device for file access, and
        the second cache area being configured to temporarily store the data to be read/written from/to the storage device for block access;
    the at least one controller each further includes
        a first interface configured to receive, from an application virtual machine, file access to the data stored in the storage device, and
        a second interface configured to receive, from the application virtual machine, block access to the data stored in the storage device;
    the processor is configured to execute
        a file access processing module configured to process the file access, and
        a block access processing module configured to process the block access;
    the file access processing module is configured to request the block access processing module to read the requested data from the storage device in response to the data indicated by a file read request received via the first interface not being stored in the first cache area;
    the block access processing module is configured to store data read from the storage device, which is requested from the file access processing module, in the first cache area without storing the data in the second cache area;
    the file access processing module is configured to transfer the data stored in the first cache area to the application virtual machine, which has issued the file read request; and
    the block access processing module, in response to a block read request received via the second interface, is configured to store data read from the storage device in the second cache area without storing the data in the first cache area.

* * * * *